United States Patent
Ly et al.

(10) Patent No.: US 12,494,821 B2
(45) Date of Patent: Dec. 9, 2025

(54) DOWNLINK TRANSMISSION CONFIGURATION FOR RECONFIGURABLE INTELLIGENT SURFACES

(71) Applicant: QUALCOMM Incorporated, San Diego, CA (US)

(72) Inventors: Hung Dinh Ly, San Diego, CA (US); Yu Zhang, San Diego, CA (US); Saeid Sahraei, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 316 days.

(21) Appl. No.: 18/258,536

(22) PCT Filed: Feb. 7, 2021

(86) PCT No.: PCT/CN2021/075720
§ 371 (c)(1),
(2) Date: Jun. 20, 2023

(87) PCT Pub. No.: WO2022/165785
PCT Pub. Date: Aug. 11, 2022

(65) Prior Publication Data
US 2024/0356585 A1  Oct. 24, 2024

(51) Int. Cl.
*H04B 7/04* (2017.01)
*H04L 5/00* (2006.01)

(52) U.S. Cl.
CPC ....... *H04B 7/04013* (2023.05); *H04L 5/0051* (2013.01); *H04L 5/0094* (2013.01)

(58) Field of Classification Search
CPC . H04B 7/04013; H04B 7/0617; H04L 5/0051; H04L 5/0094; H04L 5/0023; H04L 5/0048

See application file for complete search history.

(56) References Cited

U.S. PATENT DOCUMENTS

| 11,342,682 B2 * | 5/2022 | Pelletti ................. H01Q 1/007 |
| 2019/0074880 A1 | 3/2019 | Frenne et al. |

(Continued)

FOREIGN PATENT DOCUMENTS

| CN | 111010219 A | 4/2020 |
| WO | WO-2020029288 A1 | 2/2020 |
| WO | WO-2020194269 A1 | 10/2020 |

OTHER PUBLICATIONS

Buzzi S., et al. "Resource Allocation in Wireless Networks Assisted by Reconfigurable Intelligent Surfaces", 2020 IEEE 31st Annual International Symposium on Personal, Indoor and Mobile Radio Communications, Oct. 8, 2020 (Oct. 8, 2020), 6 pages, the whole document.

(Continued)

*Primary Examiner* — Kabir A Timory
(74) *Attorney, Agent, or Firm* — Paul M. McAdams; Holland & Hart LLP

(57) ABSTRACT

Methods, systems, and devices for wireless communications are described. A user equipment (UE) may receive a configuration for a transmission configuration state for receiving downlink channel transmissions from a base station via a configurable surface. The transmission configuration state may indicate a quasi-co-location source associated with transmission via the configurable surface. The UE may receive a downlink channel transmission via the configurable surface based on the transmission configuration state and the quasi-co-location source. The UE may be capable of determining whether the transmission configuration state conflicts with the quasi-co-location source indicated by the transmission configuration state. The UE may transmit an indication to the base station that the configuration for the transmission configuration state conflicts with the quasi-co-location source. The indication may include a beam failure (Continued)

indication or a measurement report. The UE may fall back to a transmission configuration state previously activated at the UE.

30 Claims, 18 Drawing Sheets

(56) References Cited

U.S. PATENT DOCUMENTS

2020/0154489 A1   5/2020   Zhou et al.
2020/0204247 A1   6/2020   Zhou et al.

OTHER PUBLICATIONS

International Search Report and Written Opinion—PCT/CN2021/075720—ISA/EPO—Nov. 10, 2021.
Supplementary European Search Report—EP21923797—Search Authority—The Hague—Oct. 11, 2024.

* cited by examiner

DOWNLINK TRANSMISSION CONFIGURATION FOR RECONFIGURABLE INTELLIGENT SURFACES

CROSS REFERENCE

The present application is a 371 national stage filing of International PCT Application No. PCT/CN2021/075720 by L Y et al. entitled "DOWNLINK TRANSMISSION CONFIGURATION FOR RECONFIGURABLE INTELLIGENT SURFACES," filed Feb. 7, 2021, which is assigned to the assignee hereof, and which is expressly incorporated by reference in its entirety herein.

FIELD OF TECHNOLOGY

The following relates to wireless communications, including downlink transmission configuration for reconfigurable intelligent surfaces. For example, the following relates to downlink transmissions via reconfigurable intelligent surfaces based on a transmission configuration state.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include one or more base stations or one or more network access nodes, each simultaneously supporting communication for multiple communication devices, which may be otherwise known as user equipment (UE). In some wireless communications systems, a base station may communicate with a UE using a reconfigurable intelligent surface (RIS).

SUMMARY

The described techniques relate to improved methods, systems, devices, and apparatuses that support downlink transmission configuration for reconfigurable intelligent surfaces. Generally, the described techniques provide for a user equipment (UE) to communicate with a base station using reconfigurable intelligent surface (RIS)-assisted communications.

A UE may receive a configuration for a transmission configuration state (e.g., a transmission configuration indicator (TCI) state) for receiving downlink channel transmissions from a base station via a configurable surface (e.g., a RIS). The UE may receive the configuration via a transmission path including the configurable surface (e.g., a RIS-assisted communications link) or a transmission path independent of the configurable surface (e.g., a non a RIS-assisted communications link). The transmission configuration state may indicate a quasi-co-location source associated with transmission via the configurable surface. The quasi-co-location source may be a synchronization signal block associated with a broadcast channel (e.g., a SS/PBCH block) or a downlink reference signal (e.g., a channel state information (CSI)-reference signal (RS) (CSI-RS)). The UE may receive a downlink channel transmission via the configurable surface (e.g., over the RIS-assisted communications link) based on the transmission configuration state and the quasi-co-location source.

In some aspects, the UE may be capable of determining whether a transmission configuration state configured by the base station conflicts with a quasi-co-location source indicated by the transmission configuration state. The UE may perform one or more operations for addressing the conflict between the transmission configuration state and the indicated quasi-co-location source. For example, the transmission configuration state may be associated with RIS-assisted communications, and the quasi-co-location source indicated by the transmission configuration state may be associated with non RIS-assisted communications. The UE may transmit an indication to the base station that the configuration for the transmission configuration state (e.g., for RIS-assisted communications) conflicts with the quasi-co-location source (e.g., for non RIS-assisted communications). The indication may include, for example, a beam failure indication or a measurement report associated with the quasi-co-location source. In some aspects, the UE may fall back to (e.g., activate, reactivate) a transmission configuration state previously activated at the UE. The previous transmission configuration state, for example, may be a previous transmission configuration state activated at the UE for RIS-assisted communications.

A method for wireless communication at a UE is described. The method may include receiving a configuration for a first transmission configuration state associated with receiving a first downlink channel transmission via one or more configurable surfaces, the first transmission configuration state indicating a first quasi-colocation source that is associated with transmission via the one or more configurable surfaces and receiving the first downlink channel transmission via the one or more configurable surfaces based on the first transmission configuration state and the first quasi-colocation source.

An apparatus for wireless communication at a UE is described. The apparatus may include a processor, memory in electronic communication with the processor, and instructions stored in the memory. The instructions may be executable by the processor to cause the apparatus to receive a configuration for a first transmission configuration state associated with receiving a first downlink channel transmission via one or more configurable surfaces, the first transmission configuration state indicating a first quasi-colocation source that is associated with transmission via the one or more configurable surfaces and receive the first downlink channel transmission via the one or more configurable surfaces based on the first transmission configuration state and the first quasi-colocation source.

Another apparatus for wireless communication at a UE is described. The apparatus may include means for receiving a configuration for a first transmission configuration state associated with receiving a first downlink channel transmission via one or more configurable surfaces, the first transmission configuration state indicating a first quasi-colocation source that is associated with transmission via the one or more configurable surfaces and means for receiving the first downlink channel transmission via the one or more configurable surfaces based on the first transmission configuration state and the first quasi-colocation source.

A non-transitory computer-readable medium storing code for wireless communication at a UE is described. The code may include instructions executable by a processor to receive a configuration for a first transmission configuration state associated with receiving a first downlink channel transmission via one or more configurable surfaces, the first transmission configuration state indicating a first quasi-colocation source that is associated with transmission via the one or more configurable surfaces and receive the first downlink channel transmission via the one or more configurable surfaces based on the first transmission configuration state and the first quasi-colocation source.

In some examples of the method, apparatuses, and non-transitory computer-readable medium described herein, the first quasi-colocation source includes a downlink reference signal and the method, apparatuses, and non-transitory computer-readable medium may include further operations, features, means, or instructions for receiving the downlink reference signal via the one or more configurable surfaces.

In some examples of the method, apparatuses, and non-transitory computer-readable medium described herein, the downlink reference signal includes a set of channel state information reference signal resources.

In some examples of the method, apparatuses, and non-transitory computer-readable medium described herein, the first quasi-colocation source includes one or more synchronization signal blocks associated with a broadcast channel and the method, apparatuses, and non-transitory computer-readable medium may include further operations, features, means, or instructions for receiving the one or more synchronization signal blocks via the one or more configurable surfaces.

Some examples of the method, apparatuses, and non-transitory computer-readable medium described herein may further include operations, features, means, or instructions for identifying that the first quasi-colocation source may be configured to be transmitted via the one or more configurable surfaces based on a format for a signal associated with the first quasi-colocation source.

In some examples of the method, apparatuses, and non-transitory computer-readable medium described herein, the one or more configurable surfaces include one or more reflective surfaces, one or more refractive surfaces, or both.

In some examples of the method, apparatuses, and non-transitory computer-readable medium described herein, the configuration indicates a set of transmission configuration states and the method, apparatuses, and non-transitory computer-readable medium may include further operations, features, means, or instructions for receiving control information including an indication that activates the first transmission configuration state or the second transmission configuration state and receiving the first downlink channel transmission according to the first transmission configuration state or receiving a second downlink channel transmission according to the second transmission configuration state, based on the indication.

In some examples of the method, apparatuses, and non-transitory computer-readable medium described herein, the second quasi-colocation source includes a downlink reference signal and the method, apparatuses, and non-transitory computer-readable medium may include further operations, features, means, or instructions for receiving the downlink reference signal via a transmission path excluding the one or more configurable surfaces, based on the indication.

In some examples of the method, apparatuses, and non-transitory computer-readable medium described herein, the control information further indicates a set of resources associated with receiving the first downlink channel transmission or the second downlink channel transmission.

Some examples of the method, apparatuses, and non-transitory computer-readable medium described herein may further include operations, features, means, or instructions for transmitting an activation request indicating the first transmission configuration state or the second transmission configuration state, where the control information may be received based on the activation request.

A method for wireless communication at a base station is described. The method may include transmitting a configuration for a first transmission configuration state associated with receiving a first downlink channel transmission via one or more configurable surfaces, the first transmission configuration state indicating a first quasi-colocation source that is associated with transmission via the one or more configurable surfaces and transmitting the first downlink channel transmission via the one or more configurable surfaces based on the first transmission configuration state and the first quasi-colocation source.

An apparatus for wireless communication at a base station is described. The apparatus may include a processor, memory in electronic communication with the processor, and instructions stored in the memory. The instructions may be executable by the processor to cause the apparatus to transmit a configuration for a first transmission configuration state associated with receiving a first downlink channel transmission via one or more configurable surfaces, the first transmission configuration state indicating a first quasi-colocation source that is associated with transmission via the one or more configurable surfaces and transmit the first downlink channel transmission via the one or more configurable surfaces based on the first transmission configuration state and the first quasi-colocation source.

Another apparatus for wireless communication at a base station is described. The apparatus may include means for transmitting a configuration for a first transmission configuration state associated with receiving a first downlink channel transmission via one or more configurable surfaces, the first transmission configuration state indicating a first quasi-colocation source that is associated with transmission via the one or more configurable surfaces and means for transmitting the first downlink channel transmission via the one or more configurable surfaces based on the first transmission configuration state and the first quasi-colocation source.

A non-transitory computer-readable medium storing code for wireless communication at a base station is described. The code may include instructions executable by a processor to transmit a configuration for a first transmission configuration state associated with receiving a first downlink channel transmission via one or more configurable surfaces, the first transmission configuration state indicating a first quasi-colocation source that is associated with transmission via the one or more configurable surfaces and transmit the first downlink channel transmission via the one or more configurable surfaces based on the first transmission configuration state and the first quasi-colocation source.

In some examples of the method, apparatuses, and non-transitory computer-readable medium described herein, the first quasi-colocation source includes a downlink reference signal and the method, apparatuses, and non-transitory computer-readable medium may include further operations, features, means, or instructions for transmitting the downlink reference signal via the one or more configurable surfaces.

In some examples of the method, apparatuses, and non-transitory computer-readable medium described herein, the downlink reference signal includes a set of channel state information reference signal resources.

In some examples of the method, apparatuses, and non-transitory computer-readable medium described herein, the first quasi-colocation source includes one or more synchronization signal blocks associated with a broadcast channel and the method, apparatuses, and non-transitory computer-readable medium may include further operations, features, means, or instructions for transmitting the one or more synchronization signal blocks via the one or more configurable surfaces.

Some examples of the method, apparatuses, and non-transitory computer-readable medium described herein may further include operations, features, means, or instructions for transmitting a signal associated with the first quasi-colocation source having a format associated with transmission via the one or more configurable surfaces.

In some examples of the method, apparatuses, and non-transitory computer-readable medium described herein, the one or more configurable surfaces include one or more reflective surfaces, one or more refractive surfaces, or both.

In some examples of the method, apparatuses, and non-transitory computer-readable medium described herein, the configuration indicates a set of transmission configuration states and the method, apparatuses, and non-transitory computer-readable medium may include further operations, features, means, or instructions for transmitting control information including an indication that activates the first transmission configuration state or the second transmission configuration state and transmitting the first downlink channel transmission according to the first transmission configuration state or transmitting a second downlink channel transmission according to the second transmission configuration state, based on the indication.

In some examples of the method, apparatuses, and non-transitory computer-readable medium described herein, the second quasi-colocation source includes a downlink reference signal and the method, apparatuses, and non-transitory computer-readable medium may include further operations, features, means, or instructions for transmitting the downlink reference signal via a transmission path excluding the one or more configurable surfaces.

In some examples of the method, apparatuses, and non-transitory computer-readable medium described herein, the control information further indicates a set of resources associated with receiving the first downlink channel transmission or the second downlink channel transmission.

Some examples of the method, apparatuses, and non-transitory computer-readable medium described herein may further include operations, features, means, or instructions for receiving an activation request indicating the first transmission configuration state or the second transmission configuration state, where the control information may be transmitted based on the activation request.

A method for wireless communication at a UE is described. The method may include receiving a configuration for a first transmission configuration state associated with receiving a downlink channel transmission from a base station via one or more configurable surfaces, the first transmission configuration state indicating a first quasi-colocation source associated with the downlink channel transmission, determining that the first quasi-colocation source is not associated with transmission via the one or more configurable surfaces, and communicating with the base station via the one or more configurable surfaces based on the determining that the first quasi-colocation source is not associated with transmission via the one or more configurable surfaces.

An apparatus for wireless communication at a UE is described. The apparatus may include a processor, memory in electronic communication with the processor, and instructions stored in the memory. The instructions may be executable by the processor to cause the apparatus to receive a configuration for a first transmission configuration state associated with receiving a downlink channel transmission from a base station via one or more configurable surfaces, the first transmission configuration state indicating a first quasi-colocation source associated with the downlink channel transmission, determine that the first quasi-colocation source is not associated with transmission via the one or more configurable surfaces, and communicate with the base station via the one or more configurable surfaces based on the determining that the first quasi-colocation source is not associated with transmission via the one or more configurable surfaces.

Another apparatus for wireless communication at a UE is described. The apparatus may include means for receiving a configuration for a first transmission configuration state associated with receiving a downlink channel transmission from a base station via one or more configurable surfaces, the first transmission configuration state indicating a first quasi-colocation source associated with the downlink channel transmission, means for determining that the first quasi-colocation source is not associated with transmission via the one or more configurable surfaces, and means for communicating with the base station via the one or more configurable surfaces based on the determining that the first quasi-colocation source is not associated with transmission via the one or more configurable surfaces.

A non-transitory computer-readable medium storing code for wireless communication at a UE is described. The code may include instructions executable by a processor to receive a configuration for a first transmission configuration state associated with receiving a downlink channel transmission from a base station via one or more configurable surfaces, the first transmission configuration state indicating a first quasi-colocation source associated with the downlink channel transmission, determine that the first quasi-colocation source is not associated with transmission via the one or more configurable surfaces, and communicate with the base station via the one or more configurable surfaces based on the determining that the first quasi-colocation source is not associated with transmission via the one or more configurable surfaces.

Some examples of the method, apparatuses, and non-transitory computer-readable medium described herein may further include operations, features, means, or instructions for transmitting an indication that the configuration for the first transmission configuration state conflicts with the first quasi-colocation source, the receiving of the downlink channel transmission, or both.

Some examples of the method, apparatuses, and non-transitory computer-readable medium described herein may further include operations, features, means, or instructions for transmitting the indication includes transmitting a beam failure indication associated with the first quasi-colocation source.

Some examples of the method, apparatuses, and non-transitory computer-readable medium described herein may further include operations, features, means, or instructions for transmitting the indication includes transmitting a measurement report associated with the first quasi-colocation source.

Some examples of the method, apparatuses, and non-transitory computer-readable medium described herein may further include operations, features, means, or instructions for receiving the downlink channel transmission via the one or more configurable surfaces based on a second transmission configuration state associated with receiving the downlink channel transmission via the one or more configurable surfaces, the second transmission configuration state indicating a second quasi-colocation source associated with the downlink channel transmission.

In some examples of the method, apparatuses, and non-transitory computer-readable medium described herein, the second transmission configuration state includes a previous transmission configuration state.

In some examples of the method, apparatuses, and non-transitory computer-readable medium described herein, the second quasi-colocation source may be associated with transmission via the one or more configurable surfaces.

DETAILED DESCRIPTION

Figure 1:
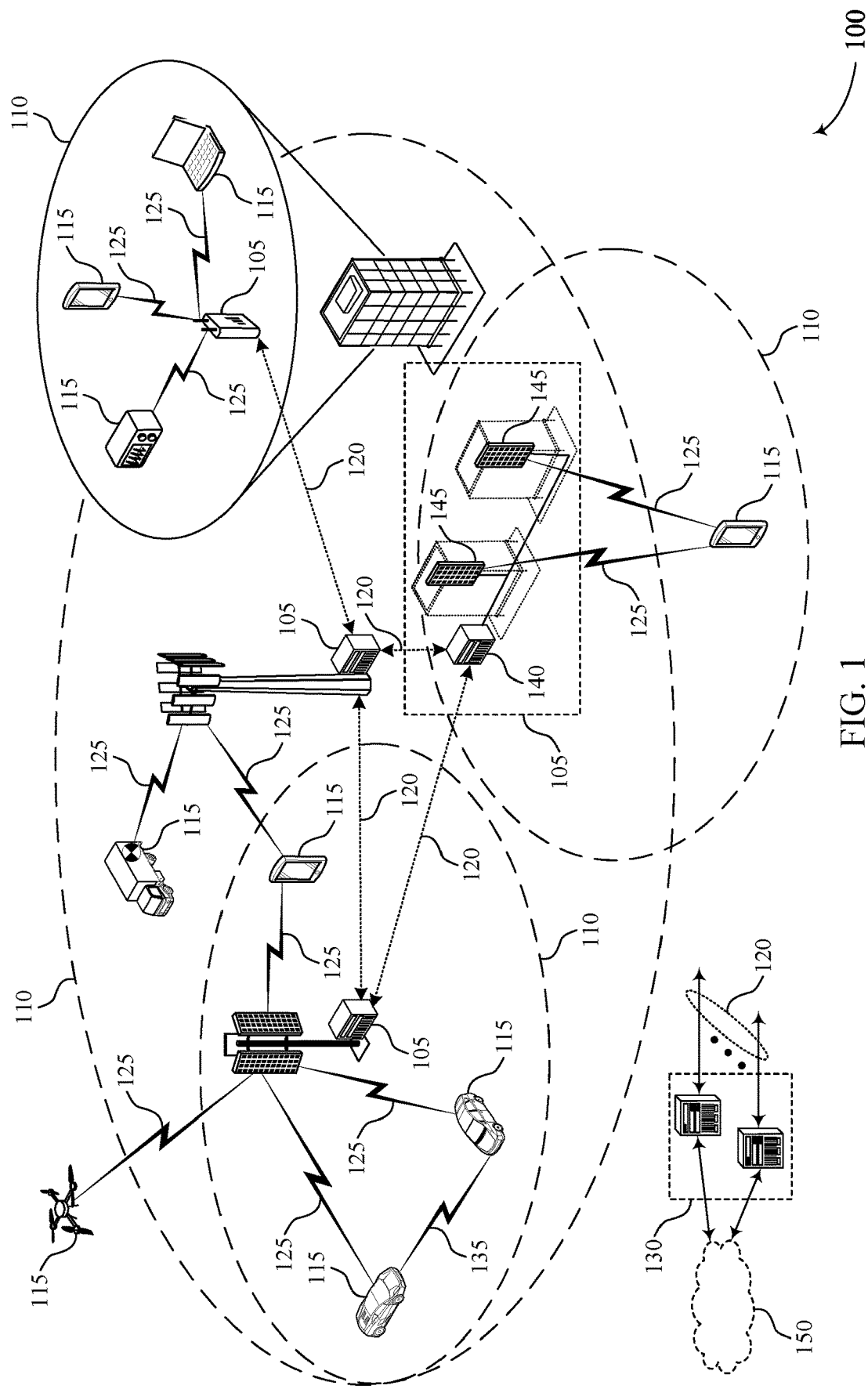
FIG. 1 illustrates an example of a wireless communications system that supports downlink transmission configuration for reconfigurable intelligent surfaces in accordance with aspects of the present disclosure.

In some wireless communications systems (e.g., systems implementing a massive multiple input-multiple output (MIMO) communication scheme), wireless devices may implement spatial division multiple access (SDMA) to increase signaling throughput. For example, a base station may use beamforming techniques to communicate with multiple user equipment (UEs) concurrently by using spatial dimensions provided by an environment. However, in some cases, physical proximity or environmental factors (e.g., interference, blockage) may impair beamforming communications between the base station and the multiple UEs. In some cases, to overcome such impairments, the base station may employ an active antenna unit (AAU) to act as a relay between the base station and the multiple UEs. The AAU may include one or more antenna ports, radio frequency (RF) chains, and power amplifiers. The AAU may allow the base station to increase spatial diversity, beamforming gain, and cell coverage. For example, the AAU may receive a beamformed communication from the base station, amplify the beamformed communication, and re-transmit the beamformed communication to a UE.

As such, in comparison to receiving the beamformed communication directly from the base station, the UE may have a higher likelihood of successfully receiving the beamformed communication via the AAU. However, active components (e.g., RF chains, power amplifiers) used by the AAU to amplify signals may be associated with increased power consumption. For example, a power amplifier at the AAU may utilize a significant power overhead to amplify and re-transmit a received signal. Such power overhead may be undesirable and inefficient in some systems.

In some examples, the base station may employ a reconfigurable intelligent surface (RIS) that uses passive or nearly passive components to redirect (e.g., reflect, refract) incoming signals in one or more directions without utilizing a significant power overhead. For example, the RIS may use configurable materials to redirect a signal in a specific direction (e.g., instead of using a power amplifier to amplify and re-transmit the signal). As such, the RIS may increase cell coverage, spatial diversity, and beamforming gain while consuming less power than an AAU. In some aspects, the base station may dynamically configure the RIS to redirect an incoming signal in a specific direction. For example, the base station may configure the RIS to redirect a beamformed communication in a direction of a UE based on a location of the UE. Similarly, the UE may transmit a beamformed communication in a direction of the RIS for redirection to the base station based on a base station configuration or a UE selection.

To effectively implement the RIS, the base station may indicate configuration information for the RIS to the UE. The configuration information may include a location of the RIS, a redirection angle of the RIS, or both. In some examples, the base station may transmit, to the UE (e.g., via a RIS), configuration information for multiple RISs in a coverage area of the base station. The UE may select one of the multiple RISs to facilitate communication with the base station based on the configuration information for the multiple RISs. In some aspects, the UE may transmit, to the base station, feedback indicating the selected RIS.

The base station may communicate with multiple UEs via one or more RISs distributed throughout a coverage area. In some examples, the base station may use multiple RISs to communicate with a single UE. For example, if a path between a UE and the base station using a RIS is obstructed, experiences interference, or otherwise drops below a quality or signal strength threshold, the base station may use another RIS (or RISs) to communicate with the UE via a different path. As such, communication using one or more RISs may provide increased spatial diversity, cell coverage, and throughput, among other benefits.

A UE may support receiving downlink communications directly from a base station, for example, over a communications link that is independent of RIS-assisted communications. The communications link independent of RIS-assisted communications may also be referred to herein as a direct communications link, a non RIS-based communications link, or a non RIS-assisted communications link. In some cases, the UE may support receiving downlink communications indirectly from the base station, for example, over a communications link that is associated with RIS-assisted communications. The communications link associated with RIS-assisted communications may also be referred to herein as an indirect communications link, a RIS-based communications link, or a RIS-assisted communications link).

In an example, the UE may receive (e.g., as part of an initial access procedure between the UE and the base station) a configuration from a base station for one or more transmission configuration states (e.g., transmission configuration indicator (TCI) states) for receiving transmissions via one or more RISs. For example, the base station may configure the UE according to a first transmission configuration state supportive of indirect communication of downlink channel transmissions (e.g., physical downlink control channel (PDCCH), physical downlink shared channel (PDSCH)) and downlink reference signals (e.g., CSI-RSs) from the base station, over a RIS-based communications link. In another example, the base station may configure the UE according to a second transmission configuration state supportive of direct communication of downlink channel transmissions (e.g., PDCCH, PDSCH) and downlink reference signals (e.g., CSI-RSs) from the base station, independent of the one or more RISs, over a non RIS-based communications link. In some aspects, based on a transmission configuration state indicated in the initial access procedure, the UE may identify whether communications between the base station and the UE are to be RIS-based or non RIS-based.

However, in some systems, the UE may be unable to determine whether the transmission configuration state is properly configured for directly (e.g., over a non RIS-based communications link, non RIS-assisted) or indirectly (e.g., over a RIS-based communications link, RIS-assisted) receiving downlink channel transmissions from the base station. For example, the base station may configure the UE for indirect communication with the base station (e.g., over an RIS-based communications link) according to the first transmission configuration state, and the UE may expect to receive downlink channel transmissions indirectly from the base station. However, in an example in which the UE is configured by the base station for indirect communication (e.g., over a RIS-based communications link) according to the first transmission configuration state, but the base station instead directly (e.g., over a non RIS-based communications link) transmits a downlink channel transmission to the UE, the UE may be unable to successfully receive the downlink channel transmission. Accordingly, the UE may initiate beam failure detection procedures (e.g., recovery) or radio link failure procedures, leading to high power consumption at the UE and communication disruptions.

In another example, the base station may configure the UE for direct communication with the base station (e.g., over a non RIS-based communications link) according to the second transmission configuration state, and the UE may expect to receive downlink channel transmissions directly from the base station. However, in an example in which the UE is configured by the base station for direct communication (e.g., over a non RIS-based communications link) according to the second transmission configuration state, but the base station instead indirectly (e.g., over an RIS-based communications link) transmits a downlink channel transmission to the UE, the UE may be unable to successfully receive the downlink channel transmission. Accordingly, the UE may initiate beam failure detection procedures (e.g., recovery) or radio link failure procedures, leading to high power consumption at the UE and communication disruptions.

In some other cases, the first transmission configuration state may indicate a quasi-co-location source associated with indirect (e.g., over an RIS-based communications link) transmissions from the base station. In an example, the quasi-co-location source may be a synchronization signal block associated with a broadcast channel (e.g., a SS/PBCH block) or a channel state information (CSI)-reference signal (RS) (CSI-RS), which the UE may use for interference measurement and interference management. In an example in which the UE is configured by the base station for indirect communication (e.g., over a RIS-based communications link) according to the first transmission configuration state, but the base station instead transmits a SS/PBCH block or CSI-RS directly to the UE (e.g., over a non RIS-based communications link), the UE may be unable to accurately perform an interference measurement for indirect communication (e.g., over a RIS-based communications link) with the base station.

In some cases, the second transmission configuration state may indicate a quasi-co-location source associated with direct transmissions from the base station (e.g., over an RIS-based communications link). In an example, the quasi-co-location source may be a SS/PBCH block or a CSI-RS, which the UE may use for channel estimation, interference measurement, or interference management. In an example in which the UE is configured by the base station for direct communication (e.g., over a non RIS-based communications link) according to the second transmission configuration state, but the base station instead transmits a SS/PBCH block or CSI-RS indirectly to the UE (e.g., over an RIS-based communications link), the UE may be unable to accurately perform an interference measurement for indirect communication (e.g., over a RIS-based communications link) with the base station.

According to example aspects of the present disclosure, a UE may receive a configuration for a transmission configuration state for receiving downlink channel transmissions from a base station via a configurable surface (e.g., a RIS). The UE may receive the configuration via a transmission path including the configurable surface (e.g., a RIS-assisted communications link) or a transmission path independent of the configurable surface (e.g., a non a RIS-assisted communications link). The transmission configuration state may indicate a quasi-co-location source associated with transmission via the configurable surface. The quasi-co-location source may be a synchronization signal block associated with a broadcast channel (e.g., a SS/PBCH block) or a downlink reference signal (e.g., a CSI-RS). The UE may receive a downlink channel transmission via the configurable surface (e.g., over the RIS-assisted communications link) based on the transmission configuration state and the quasi-co-location source.

In some aspects, the UE may be capable of determining whether a transmission configuration state configured by the base station conflicts with a quasi-co-location source indicated by the transmission configuration state. The UE may perform one or more operations for addressing the conflict between the transmission configuration state and the indicated quasi-co-location source. For example, the transmission configuration state may be associated with RIS-assisted communications, and the quasi-co-location source indicated by the transmission configuration state may be associated with non RIS-assisted communications. The UE may transmit an indication to the base station that the configuration for the transmission configuration state (e.g., for RIS-assisted communications) conflicts with the quasi-co-location source (e.g., for non RIS-assisted communications). The indication may include, for example, a beam failure indication or a measurement report associated with the quasi-co-location source. In some aspects, the UE may fall back to (e.g., activate, reactivate) a transmission configuration state previously activated at the UE. The previous transmission configuration state, for example, may be a previous transmission configuration state activated at the UE for RIS-assisted communications.

FIG. 1 illustrates an example of a wireless communications system 100 that supports downlink transmission configuration for reconfigurable intelligent surfaces (e.g., based on transmission configuration state considerations) in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communications links 125. Each base station 105 may provide a coverage area 110 over which the UEs 115 and the base station 105 may establish one or more communications links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communications links 125 over one or more carriers. The term "carrier" may refer to a set of radio frequency spectrum resources having a defined physical layer structure for supporting the communications links 125. For example, a carrier used for a communications link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communications link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communications link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signalto-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

According to example aspects of the present disclosure, a base station 105 may determine a transmission configuration state for communicating with a UE 115. In an example, the UE 115 may receive a configuration (e.g., via a configuration message) from the base station 105 for a transmission configuration state (e.g., a TCI state) associated with receiving downlink channel transmissions (e.g., physical downlink control channel (PDCCH) transmissions, physical downlink shared channel (PDSCH) transmissions). In some examples, the configuration message may be an RRC signaling message.

In some examples, the configuration may indicate one or more transmission configuration states. For example, the configuration may indicate multiple transmission configuration states. In some aspects, one or more of the transmission configuration states may be associated with RIS-based communications. For example, one or more of the transmission configuration states may be associated with receiving downlink channel transmissions via a RIS (or via multiple RISs). In an example, the transmission configuration states associated with receiving downlink channel transmissions via the RIS (or via multiple RISs) may include downlink reference signals as quasi-co-location source associated with (e.g., dedicated) for RIS-based communications.

In some other aspects, one or more of the transmission configuration states may be independent of RIS-based communications. For example, one or more of the transmission configuration states (e.g., a second group of transmission configuration states) may be independent of the RIS (or RISs). In an example, the transmission configuration states (e.g., a second group of transmission configuration states) independent of the RIS (or RISs) may include downlink reference signals as quasi-co-location sources that are independent of (e.g., not associated with) RIS-based communications.

Each of the transmission configuration states may include or indicate quasi-co-location relationships between downlink reference signals and DM-RS ports. In some examples, the downlink reference signals may include CSI-RSs. In some other examples, the downlink reference signals may include SS/PBCHs. Example aspects of the reference signals and the quasi-co-location relationship types are described with reference to FIG. 3.

According to example aspects of the present disclosure, the UE 115 may receive, from the base station 105, control information indicating a transmission configuration state (e.g., a first transmission configuration state associated with RIS-based communications, a second transmission configuration state independent of RIS-based communications) for receiving downlink channel transmissions (e.g., PDCCH, PDSCH) or downlink reference signals (e.g., SS/PBCHs, CSI-RSs) from the base station 105. The UE 115 may receive the control information over an RIS-based communications link (e.g., via the RIS) or over a non RIS-based communications link (e.g., independent of the RIS). In an example, the control information may be included in an activation message (e.g., a downlink control information (DCI) message) transmitted by the base station 105. In some aspects, the control information may further indicate time and frequency resources associated with receiving a downlink channel transmission.

In an example, the control information may include an indication that activates the first transmission configuration state. According to the first transmission state, for example, the UE 115 may receive a quasi-co-location source and the downlink channel transmission via a transmission path including the RIS. For example, the base station 105 may transmit the quasi-co-location source to the UE 115 via the RIS using the RIS-based communications link. In another example, the base station 105-a may transmit the downlink channel transmission to the UE 115 via the RIS 305 using the RIS-based communications link.

In another example, the control information may include an indication that activates the second transmission configuration state. According to the second transmission state, for example, the UE 115 may receive a quasi-co-location source and the downlink channel transmission via a transmission path independent of (e.g., excluding) the RIS. For example, the base station 105 may transmit the quasi-co-location source to the UE 115 using a non RIS-based communications link (e.g., independent of the RIS). In another example, the base station 10a may transmit the downlink channel transmission to the UE 115 using the non RIS-based communications link.

In some aspects, the UE 115 may transmit an activation request to the base station 105 indicating a transmission configuration state. For example, the activation request may indicate the first transmission configuration state (e.g., for RIS-based communications) or the second transmission configuration state (e.g., for non RIS-based communications). In some aspects, the UE 115 may transmit the activation request via an uplink control information (UCI) message, a MAC control element (CE), or an RRC message. In an example, the base station 105 may transmit (and the UE 115 may receive) the control information based on the activation request.

According to example aspects of the present disclosure, the configuration received by the UE 115 (e.g., via the configuration message) from the base station 105 may indicate the first transmission configuration state, where the first transmission configuration state is associated with receiving a downlink channel transmission via the RIS (or via multiple RISs). In some aspects, the first transmission configuration state may indicate a quasi-co-location source associated with transmission via the RIS.

The UE 115 may determine (e.g., identify) that the quasi-co-location source is configured to be transmitted via the transmission path including the RIS (e.g., using the RIS-based communications link). For example, based on a format of the quasi-co-location source, the UE 115 may identify that the quasi-co-location source is configured to be transmitted via the transmission path including the RIS (e.g., using the RIS-based communications link).

The quasi-co-location source may include a SS/PBCH block. In some aspects, for a UE 115 incapable of RIS-based communications or not configured for RIS-based communications, such a UE 115 may be unable to decode the quasi-co-location source (e.g., SS/PBCH block). In another example, the quasi-co-location source may be a downlink reference signal. For example, the quasi-co-location source may be a CSI-RS. In some aspects, the quasi-co-location source (e.g., CSI-RS) may include or indicate CSI-RS resources allocated for transmissions via the RIS.

In another example, the configuration received by the UE 115 (e.g., via the configuration message) from the base station 105 may indicate the second transmission configuration state (e.g., a second TCI state), where the second transmission configuration state is associated with receiving the downlink channel transmission independent of the RIS. In some aspects, the second transmission configuration state may indicate a quasi-co-location source that is not associated with transmission via the RIS.

The UE 115 may determine (e.g., identify) that the quasi-co-location source is configured to be transmitted via the transmission path independent of the RIS (e.g., using the non RIS-based communications link). For example, based on a format of the quasi-co-location source, the UE 115 may identify that the quasi-co-location source is configured to be transmitted via the transmission path independent of the RIS (e.g., using the non RIS-based communications link).

The quasi-co-location source may include a SS/PBCH block. In another example, the quasi-co-location source may be a downlink reference signal. For example, the quasi-co-location source may be a CSI-RS. In some aspects, the quasi-co-location source (e.g., CSI-RS) may include or indicate CSI-RS resources allocated for transmissions independent of the RIS (or RISs).

According to example aspects of the present disclosure, the UE 115 may be capable of determining whether a transmission configuration state configured by the base station 105 conflicts with a quasi-co-location source indicated by the transmission configuration state. The UE 115 may perform one or more operations for addressing the conflict between the transmission configuration state and the indicated quasi-co-location source.

For example, the UE 115 may receive a configuration for a first transmission configuration state (e.g., for RIS-based communications) associated with receiving a downlink channel transmission from the base station 105 via the RIS (or RISs). In an example, the first transmission configuration state may indicate a quasi-co-location source. In an example, the UE 115 may determine that, in contrast to the first transmission configuration state (e.g., for RIS-based communications), the quasi-co-location source is not associated with transmission via the RIS (or RISs 30). In an example, the UE 115 may determine that the quasi-co-location source is not dedicated for RIS-based communications. For example, the UE 115 may determine that the quasi-co-location source is configured to be transmitted via a transmission path independent of the RIS (e.g., over the non RIS-based communications link).

The UE 115 may transmit an indication to the base station 105 that the configuration for the first transmission configuration state for RIS-based communications conflicts with the quasi-co-location source for non RIS-based communications. For example, the UE 115 may transmit an indication that the configuration for the first transmission configuration state for RIS-based communications conflicts with receiving the downlink channel transmission 335. In an example of the indication, the UE 115 may transmit a beam failure indication associated with the quasi-co-location source. In another example of the indication, the UE 115 may transmit a measurement report associated with the quasi-co-location source. In some aspects, the measurement report may be a reference signal received power (RSRP) report.

In some aspects, the UE 115 may not expect to receive a configuration for a transmission configuration state for RIS-based communications in which the transmission configuration state indicates a quasi-co-location source for non RIS-based communications. In some other cases, the UE 115 may not expect to receive a configuration for a transmission configuration state for non RIS-based communications in which the transmission configuration state indicates a quasi-co-location source for RIS-based communications. Accordingly, for example, when the UE 115 determines (e.g., identifies) that a configuration for a transmission configuration state (e.g., for RIS-based communications) conflicts with a quasi-co-location source (e.g., for non RIS-based communications) indicated by the transmission configuration state, the UE 115 may transmit an indication as described herein to inform the base station 105 of the conflict.

In some examples, based on determining that the configuration for the first transmission configuration state for RIS-based communications conflicts with the quasi-co-location source for non RIS-based communications, the UE 115 may fall back to (e.g., activate, reactivate) a transmission configuration state previously activated at the UE 115. The previous transmission configuration state, for example, may be a previous transmission configuration state for RIS-based communications (e.g., over the RIS-based communications link). The previous transmission configuration state may, for example, indicate the quasi-co-location source associated with the downlink channel transmission. In an example, the UE 115 may receive the downlink channel transmission via the RIS based on the previous transmission configuration state.

Aspects of the disclosure are initially described in the context of wireless communications systems. Examples of processes and signaling exchanges that support downlink transmission configuration for reconfigurable intelligent surfaces. Aspects of the disclosure are further illustrated by and described with reference to apparatus diagrams, system diagrams, and flowcharts that relate to downlink transmission configuration for reconfigurable intelligent surfaces.

Figure 2:
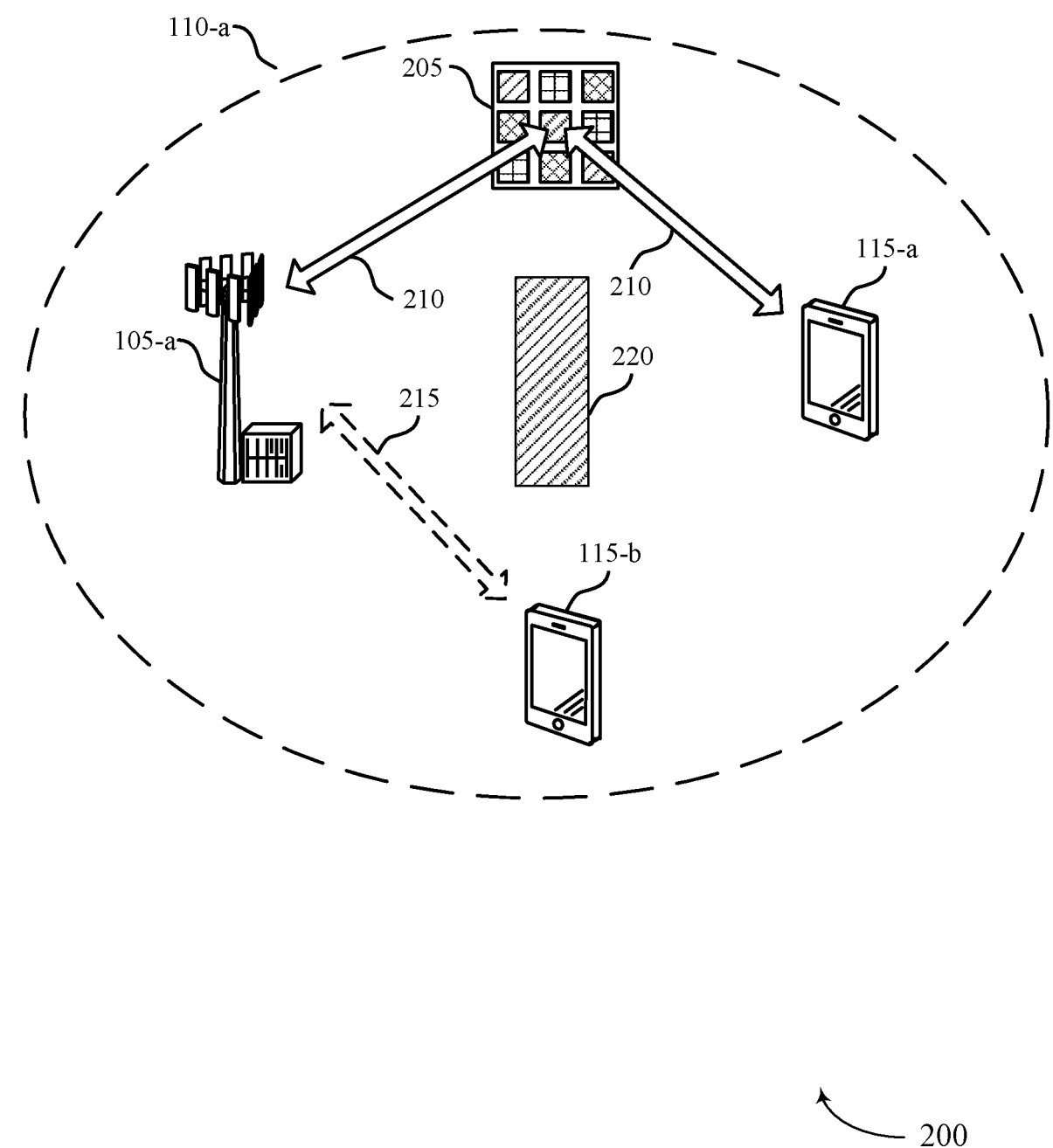
FIG. 2 illustrates an example of a wireless communications system that supports downlink transmission configuration for reconfigurable intelligent surfaces in accordance with aspects of the present disclosure.

FIG. 2 illustrates an example of a wireless communications system 200 that supports downlink transmission configuration for reconfigurable intelligent surfaces in accordance with aspects of the present disclosure. In some examples, wireless communications system 200 may implement aspects of wireless communication system 100. For example, the wireless communications system 200 may include a UE 115-*a*, a UE 115-*b*, and a base station 105-*a*, which may be examples of corresponding devices described herein with reference to FIG. 1. In some cases, wireless communications system 200 may support downlink transmissions via reconfigurable intelligent surfaces based on a transmission configuration state.

In some aspects, the UE 115-*a* and the base station 105-*a* may communicate within a geographic coverage area 110-*a* of the base station 105-*a* via a communications link 210. For example, the base station 105-*a* may configure the UE 115-*a* according to a first TCI state supportive of indirect communication of downlink channel transmissions (e.g., PDCCH, PDSCH) and downlink reference signals (e.g., CSI-RSs) from the base station 105-*a*. The communications link 210 may be a RIS-based communications link. In an example, the UE 115-*a* and the base station 105-*a* may use a RIS 205 to communicate via a communications link 210. In some cases, the UE 115-*a* and the base station 105-*a* may use multiple RISs 205 to communicate via the communications link 210.

In some other aspects, the UE 115-*b* and the base station 105-*a* may communicate within the geographic coverage area 110-*a* of the base station 105-*a* via a communications link 215. For example, the base station 105-*a* may configure the UE 115-*b* according to a second TCI state supportive of direct communication of downlink channel transmissions (e.g., PDCCH, PDSCH) and downlink reference signals (e.g., CSI-RSs) from the base station 105-*a*. The communications link 215 may be a non RIS-based communications link. In an example, the UE 115-*b* and the base station 105-*a* may communicate via the communications link 215, independent of the RIS 205 (or independent of any number of RISs 205).

The RIS 205 may be a near passive device that redirects incoming signals in a specific direction according to a configuration of the RIS 205. In some examples, the configuration of the RIS 205 may be preconfigured, statically or semi-statically configured, or configured by a network (e.g., configured by the base station 105-*a*). For example, the base station 105-*a* may transmit a message to the RIS 205 configuring one or more elements of the RIS 205. The RIS 205 may include any combination of reflective and refractive surfaces configured to redirect signals between the base station 105-*a* and the UE 115-*a* (e.g., rather than using active components to amplify and re-transmit the signals).

The RIS 205 may include a processing component (e.g., a processor) that may determine a configuration for the RIS 205 (e.g., based on a message from the base station 105-*a*) and may adjust one or more parameters of the RIS 205 to support the configuration. For example, the RIS 205 may use one or more passive or near passive components to redirect signals between the base station 105-*a* and the UE 115-*a* (e.g., rather than using active components to amplify and re-transmit the signals). The RIS 205 may adjust the materials, components, or combination thereof to support a specific configuration for one or more elements of the RIS 205 (e.g., based on a configuration message from the base station 105-*a*). The RIS 205 may have a wired connection or a wireless connection with the base station 105-*a* and may be located anywhere in the coverage area 110-*a* of the base station 105-*a*.

In some aspects, using the RIS 205 (or multiple RISs 205) may extend the coverage area 110-*a* of the base station 105-*a*. In some other aspects, using the RIS 205 (or multiple RISs 205) may provide for communications between the base station 105-*a* and the UE 115-*a* under conditions in which direct communications may be unreliable. For example, interference resulting from physical proximity or environmental factors (e.g., interference, blockage 220) may be avoided or mitigated by communicating via the RIS 205 (or multiple RISs 205).

According to example aspects of the present disclosure, the base station 105-*b* may perform different channel training procedures (e.g., beamforming, beam sweeping techniques) with a UE 115 (e.g., UE 115-*a*, UE 115-*b*) based on whether the UE 115 is capable of indirect communication with the base station 105-*a* (e.g., RIS-assisted) or direct communication with the base station 105-*a* (e.g., non RIS-assisted). In some cases, the wireless communications system 200 may support initial access procedures via which a UE 115 (e.g., UE 115-*a*, UE 115-*b*) and the base station 105-*a* may identify whether communications therebetween are to be RIS-based or non RIS-based.

For example, the UE 115-*a* may be capable of RIS-based communications, and the base station 105-*a* may transmit a set of synchronization signal blocks (SSBs) having a format associated with (indicative of) RIS-based communications to the UE 115-*a*. In some aspects, in establishing RIS-based communications, the base station 105-*a* may use a fixed beam (or beam direction) for communications with the RIS 205, and the RIS 205 may conduct beamforming operations supportive of directional communications with the UE 115-*a*.

In another example, the UE 115-*b* may be incapable of RIS-based communications or not configured for RIS-based communications, and the base station 105-*a* may transmit a set of SSBs having a format associated with (indicative of) non RIS-based communications to the UE 115-*b*. In establishing RIS-based communications, the base station 105-*a* may conduct beamforming operations supportive of directional communications with the UE 115-*a*.

Figure 3:
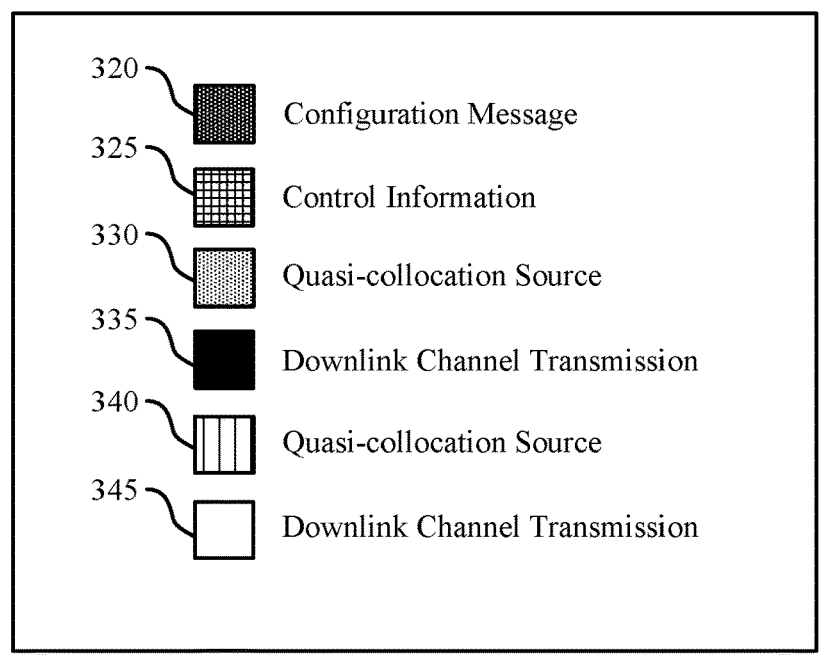
FIG. 3 illustrates an example of a wireless communications system that supports downlink transmission configuration for reconfigurable intelligent surfaces in accordance with aspects of the present disclosure.
Figure 3:
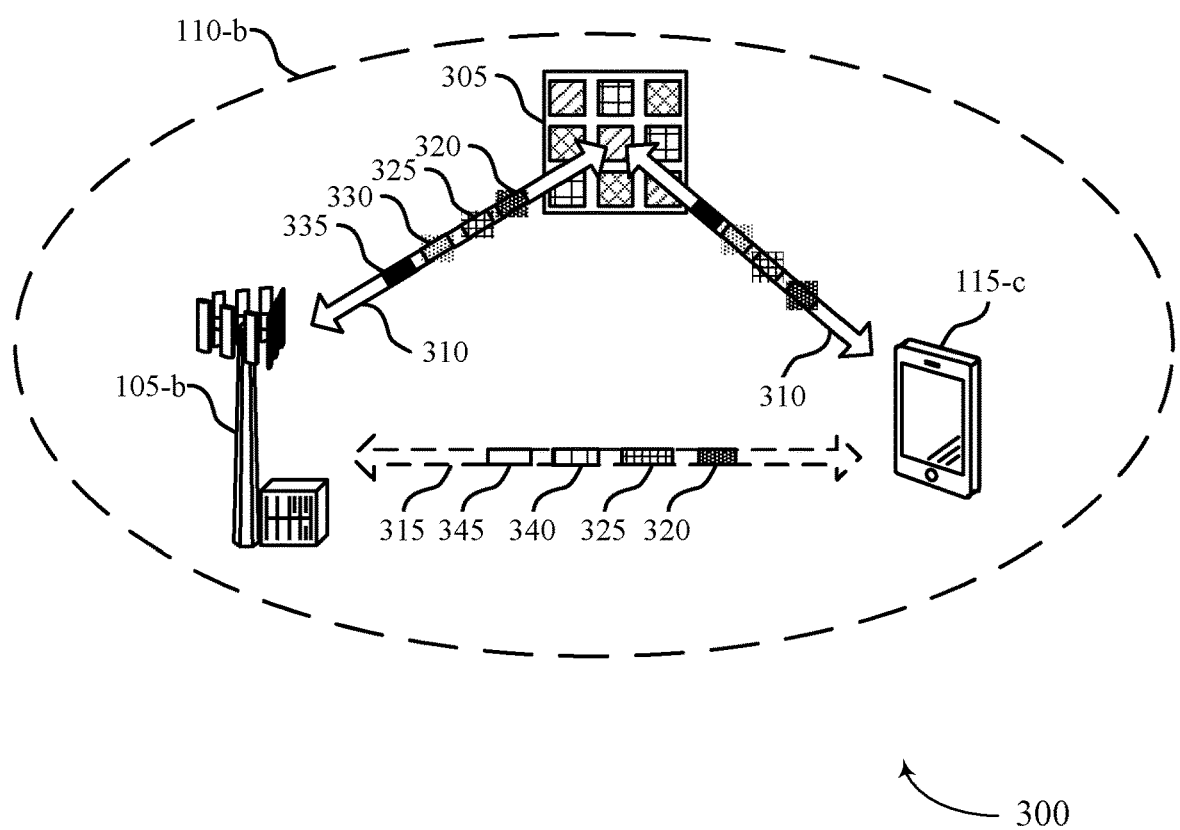

FIG. 3 illustrates an example of a wireless communications system 300 that supports downlink transmission configuration for reconfigurable intelligent surfaces in accordance with aspects of the present disclosure. For example, wireless communications system 300 may support downlink transmissions via reconfigurable intelligent surfaces based on a transmission configuration state.

The wireless communications system 300 may implement aspects of the wireless communications systems 100 and 200. For example, the wireless communications system 300 may include a UE 115-*c* and a base station 105-*b*, which may be examples of corresponding devices described herein with reference to FIGS. 1 and 2. In some aspects, the base station 105-*b* may communicate with the UE 115-*c* over a communications link 310 (e.g., via a RIS 305). In some other aspects, the base station 105-*b* may communicate with the UE 115-*c* over a communications link 315 (e.g., a non RIS-based communications link, independent of the RIS 305). The UE 115-*c* and the base station 105-*b* may communicate within the geographic coverage area 110-*b* of the base station 105-*b* via the communications link 310 or the communications link 315.

According to example aspects of the present disclosure, the base station 105-*b* may determine a transmission configuration state for communicating with the UE 115-*c*. In an example, the UE 115-*c* may receive a configuration (e.g., via a configuration message 320) from the base station 105-*b* for a transmission configuration state (e.g., a TCI state) associated with receiving downlink channel transmissions (e.g., PUCCH transmissions, PUSCH transmissions). In some examples, the configuration message 320 may be an RRC signaling message.

In some examples, the configuration may indicate one or more transmission configuration states. For example, the configuration may indicate multiple transmission configuration states. In some aspects, one or more of the transmission configuration states may be associated with RIS-based communications. For example, one or more of the transmission configuration states may be associated with receiving downlink channel transmissions via the RIS 305 (or via multiple RISs 305). In an example, the transmission configuration states associated with receiving downlink channel transmissions via the RIS 305 (or via multiple RISs 305) may include downlink reference signals as quasi-co-location source associated with (e.g., dedicated) for RIS-based communications.

In some other aspects, one or more of the transmission configuration states may be independent of RIS-based communications. For example, one or more of the transmission configuration states may be independent of the RIS 305 (or RISs 305). In an example, the transmission configuration states independent of the RIS 305 (or RISs 305) may include downlink reference signals as quasi-co-location sources that are independent of (e.g., not associated with) RIS-based communications.

Each of the transmission configuration states may include or indicate quasi-co-location relationships between downlink reference signals and demodulation reference signal (DM-RS) ports. In some examples, the downlink reference signals may include CSI-RSs. In some other examples, the downlink reference signals may include SS/PBCHs.

In an example case, a transmission configuration state (e.g., a transmission configuration state associated with RIS-based communications, or a transmission configuration state independent of RIS-based communications) may include parameters for configuring a quasi co-location relationship between a downlink reference signal and DM-RS ports associated with the PDSCH. In an example, for a DM-RS associated with a PDSCH, a CSI-RS resource may be configured as a quasi-co-location source for the transmission configuration state.

In another example case, a transmission configuration state may include parameters for configuring a quasi co-location relationship between a downlink reference signal and DM-RS ports associated with a PDCCH. In an example, for a DM-RS associated with a PDCCH, a CSI-RS resource may be configured as a quasi-co-location source for the transmission configuration state. In some other cases, a transmission configuration state may include parameters for configuring a quasi co-location relationship between a downlink reference signal and a CSI-RS port of a CSI-RS resource.

The transmission configuration states may indicate quasi-co-location relationships according to QCL-TypeA (e.g., for channel characteristics including Doppler shift, Doppler spread, average delay, and delay spread supportive of obtaining channel state information). In some aspects, the transmission configuration states may indicate quasi-co-location relationships according to QCL-TypeB (e.g., for channel characteristics including Doppler shift and Doppler spread supportive of obtaining channel state information).

In some other aspects, the transmission configuration states may indicate quasi-co-location relationships according to QCL-TypeC (e.g., for channel characteristics including Doppler shift and average delay supportive of measurement information such as RSRP). According to some aspects, the transmission configuration states may indicate quasi-co-location relationships according to QCL-TypeD (e.g., for channel characteristics including spatial Rx parameter supportive of beamforming).

According to example aspects of the present disclosure, the UE 115-c may receive, from the base station 105-b, control information 325 indicating a transmission configuration state (e.g., a first transmission configuration state associated with RIS-based communications, a second transmission configuration state independent of RIS-based communications) for receiving downlink channel transmissions (e.g., PDCCH, PDSCH) or downlink reference signals (e.g., SS/PBCHs, CSI-RSs) from the base station 105-b. The UE 115-c may receive the control information 325 via communications link 310 (e.g., via the RIS 305) or via communications link 315. In an example, the control information 325 may be included in an activation message (e.g., a downlink control information (DCI) message) transmitted by the base station 105-b. In some aspects, the control information 325 may further indicate time and frequency resources associated with receiving a downlink channel transmission 335 or a downlink channel transmission 345.

In an example, the control information 325 may include an indication that activates the first transmission configuration state. According to the first transmission state, for example, the UE 115-c may receive a quasi-co-location source 330 and the downlink channel transmission 335 via a transmission path including the RIS 305. For example, the base station 105-a may transmit the quasi-co-location source 330 to the UE 115-c via the RIS 305 using the communications link 310. In another example, the base station 105-a may transmit the downlink channel transmission 335 to the UE 115-c via the RIS 305 using the communications link 310.

In another example, the control information 325 may include an indication that activates the second transmission configuration state. According to the second transmission state, for example, the UE 115-c may receive a quasi-co-location source 340 and the downlink channel transmission 345 via a transmission path independent of (e.g., excluding) the RIS 305. For example, the base station 105-a may transmit the quasi-co-location source 340 to the UE 115-c using the communications link 315. In another example, the base station 105-a may transmit the downlink channel transmission 345 to the UE 115-c using the communications link 315.

In some aspects, the UE 115-c may transmit an activation request to the base station 105-b indicating a transmission configuration state. For example, the activation request may indicate the first transmission configuration state (e.g., for RIS-based communications) or the second transmission configuration state (e.g., for non RIS-based communications). In some aspects, the UE 115-c may transmit the activation request via an uplink control information (UCI) message, a MAC control element (CE), or an RRC message. In an example, the base station 105-b may transmit (and the UE 115-c may receive) the control information 325 based on the activation request.

According to example aspects of the present disclosure, the configuration received by the UE 115-c (e.g., via the configuration message 320) from the base station 105-b may indicate the first transmission configuration state, where the first transmission configuration state is associated with receiving the downlink channel transmission 335 via the RIS 305 (or via multiple RISs 305). In some aspects, the first transmission configuration state may indicate the quasi-co-location source 330, where the quasi-co-location source 330 is associated with transmission via the RIS 305.

The UE 115-c may determine (e.g., identify) that the quasi-co-location source 330 is configured to be transmitted via the transmission path including the RIS 305 (e.g., using the communications link 310). For example, based on a format of the quasi-co-location source 330, the UE 115-c may identify that the quasi-co-location source 330 is configured to be transmitted via the transmission path including the RIS 305 (e.g., using the communications link 310).

The quasi-co-location source 330 may include a SS/PBCH block (e.g., SSB inclusive of one or more synchronization signals and a PBCH channel). In some aspects, for a UE 115 incapable of RIS-based communications, such a UE 115 may be unable to decode the quasi-co-location source 330 (e.g., SS/PBCH block). In another example, the quasi-co-location source 330 may be a downlink reference signal. For example, the quasi-co-location source 330 may be a CSI-RS. In some aspects, the quasi-co-location source 330 (e.g., CSI-RS) may include or indicate CSI-RS resources allocated for transmissions via the RIS 305.

In an example in which the quasi co-location source 330 includes an SS/PBCH block, the base station 105-b may transmit SSBs having a format associated with (indicative of) RIS-based communications to the UE 115-c. For example, the base station 105-b may periodically transmit SS bursts including type 1 SSBs. Type 1 SSBs are SSBs configured for RIS-assisted channel training procedures (e.g. RIS-assisted initial access procedures). For example, RIS-assisted procedures may include channel training procedures to establish a communication channel (e.g., communications link 310) between the base station 105-b and the UE 115-c using the RIS 305 to create the propagation path between the base station 105-b and the UE 115-c. The type 1 SSB may include a primary synchronization signal (PSS), a secondary synchronization signal (SSS) and a PBCH. In some aspects, the type 1 SSB may be distinguishable from the type 0 SSB by transmitting the type 1 SSB over a separate synchronization frequency associated with the type 1 SSB. In some aspects, the type 1 SSB may be distinguishable from the type 0 SSB by an indication included in the type 1 SSB, such as an indication in the SSS of the type 1 SSB or indication in the PBCH of the type 1 SSB.

In some aspects, the base station 105-*b* may transmit multiple type 1 SSBs of the SS burst using different transmit beams. For example, the base station 105-*b* may transmit each transmit beam using a corresponding spatial filter to transmit a corresponding type 1 SSB in a distinct direction of the spatial coverage area (e.g., a portion of geographic coverage area 110-*b*) of the base station 105-*b*. In this case, the synchronization burst of type 1 SSBs may result in providing service coverage to at least a portion of the spatial coverage area of the base station 105-*b*.

Additionally, or alternatively, the base station 105-*b* may transmit multiple type 1 SSBs of the SS burst using the same transmit beam. For example, the base station 105-*b* may transmit multiple type 1 SSBs using a transmit beam transmitted in a direction associated with the RIS 305. In this case, the base station 105-*b* may control propagation characteristics of the RIS 305 to ensure that the type 1 SSBs are reflected from the RIS 305 on distinct beams corresponding to distinct directions of a spatial coverage area of the RIS 305. For example, the base station 105-*b* may transmit a first type 1 SSB on a transmit beam directed towards the RIS 305.

The base station 105-*b* may control a configuration of the RIS 305 such that the first type 1 SSB is reflected from the RIS 305 on a first beam (e.g., a beam 0) in a first direction. The base station 105-*b* may further transmit a second type 1 SSB in on the transmit beam directed towards the RIS 305. The base station 105-*b* may control the configuration of the RIS 305 such that the second type 1 SSB is reflected from the RIS 305 on a second beam (e.g., a beam 1) in a second direction. The base station 105-*b* may further transmit a third type 1 SSB in on the transmit beam directed towards the RIS 305. The base station 105-*b* may control the configuration of the RIS 305 such that the third type 1 SSB is reflected from the RIS 305 on a third beam (e.g., a beam 2) in a third direction. The base station 105-*b* may further transmit a fourth type 1 SSB in on the transmit beam directed towards the RIS 305.

The base station 105-*b* may control the configuration of the RIS 305 such that the fourth type 1 SSB is reflected from the RIS 305 on a fourth beam (e.g., a beam 3) in a fourth direction. The reflection directions associated with the beams from the RIS 305 may be configured to provide service coverage to at least a portion of the spatial coverage area of the base station 105-*b* reachable by the RIS 305. For example, the reflection directions of the RIS 305 may be configured to provide service coverage for a portion of the spatial coverage area of the base station 105-*b* otherwise unreachable by the base station 105-*b* due to a blockage.

In an example, the UE 115-*c* may receive the type 1 SSB, transmitted by the base station 105-*b*, via one or more beams reflected from the RIS 305. For example, the UE 115-*c* may receive the type 1 SSB reflected on the second beam (beam 1) from the RIS 305. The UE 115-*c*, based on receiving the type 1 SSB, may initiate a RIS-assisted channel training procedure (e.g., RIS-assisted initial access procedure). In the RIS-assisted channel training procedure, the base station 105-*b* may determine a cascaded channel between the base station 105-*b* and the UE 115-*c* via the RIS 305. The cascaded channel may include the transmit beam used to transmit the type 1 SSB from the base station 105-*b* to the RIS 305, the beam from the RIS 305 on which the type 1 SSB received by the UE 115-*c* was reflected, and the receive beam of the UE 115-*c* used to receive the type 1 SSB.

In another example, the configuration received by the UE 115-*c* (e.g., via the configuration message 320) from the base station 105-*b* may indicate the second transmission configuration state (e.g., a second TCI state), where the second transmission configuration state is associated with receiving the downlink channel transmission 345 independent of the RIS 305. In some aspects, the second transmission configuration state may indicate the quasi-co-location source 340, where the quasi-co-location source 340 is not associated with transmission via the RIS 305.

The UE 115-*c* may determine (e.g., identify) that the quasi-co-location source 340 is configured to be transmitted via the transmission path independent of the RIS 305 (e.g., using the communications link 315). For example, based on a format of the quasi-co-location source 340, the UE 115-*c* may identify that the quasi-co-location source 340 is configured to be transmitted via the transmission path independent of the RIS 305 (e.g., using the communications link 315).

The quasi-co-location source 340 may include a SS/PBCH block. In another example, the quasi-co-location source 340 may be a downlink reference signal. For example, the quasi-co-location source 340 may be a CSI-RS. In some aspects, the quasi-co-location source 340 (e.g., CSI-RS) may include or indicate CSI-RS resources allocated for transmissions independent of the RIS 305 (or RISs 305).

In an example in which the quasi co-location source 340 includes an SS/PBCH block, the base station 105-*b* may transmit SSBs having a format associated with (indicative of) non RIS-based communications to the UE 115-*c*. For example, the base station 105-*b* may transmit a type 0 SSB (e.g., quasi co-location source 340), and the UE 115-*c* may receive the type 0 SSB. The base station 105-*b* may periodically transmit SS bursts including type 0 SSBs for channel training procedures for non-RIS-assisted communication between the base station 105-*b* and the UE 115-*c*. In some aspects, the base station 105-*b* may transmit each type 0 SSB of the SS burst using a corresponding transmit beam. For example, the base station 105-*b* may transmit each transmit beam using a corresponding spatial filter to transmit the corresponding type 0 SSB in a distinct direction of a spatial coverage area (e.g., a portion of geographic coverage area 110-*b*) of the base station 105-*b*. In this case, the SS burst of type 0 SSBs may result in providing initial access using channel training procedures for non-RIS-assisted communication to at least a portion of the spatial coverage area of the base station 105-*b*.

The UE 115-*c* may receive the type 0 SSB on an receive beam, for example, using receive beam sweeping and transmit a PRACH communication to the base station 105-*b* to initiate a RACH procedure. In this case, beam correspondence may be maintained between the base station 105-*b* and the UE 115-*c*. That is, the UE 115-*c* may transmit the PRACH communication using a transmit beam that corresponds to the receive beam on which the UE 115-*c* received the SSB, and the base station 105-*b* may receive the PRACH communication using an receive beam that corresponds to the transmit beam used to transmit the SSB received by the first UE 120. As used herein, a transmit beam and receive beam of a device (e.g., base station or UE) correspond to each other when they correspond to the same direction or spatial filter of the device.

According to example aspects of the present disclosure, the UE 115-c may be capable of determining whether a transmission configuration state configured by the base station 105-b conflicts with a quasi-co-location source indicated by the transmission configuration state. The UE 115-c may perform one or more operations for addressing the conflict between the transmission configuration state and the indicated quasi-co-location source.

For example, the UE 115-c may receive a configuration for a first transmission configuration state (e.g., for RIS-based communications) associated with receiving a downlink channel transmission 335 from the base station 105-b via the RIS 305 (or RISs 305). In an example, the first transmission configuration state may indicate a quasi-co-location source 340. In an example, the UE 115-c may determine that, in contrast to the first transmission configuration state (e.g., for RIS-based communications), the quasi-co-location source 340 is not associated with transmission via the RIS 305 (or RISs 305). In an example, the UE 115-c may determine that the quasi-co-location source 340 is not dedicated for RIS-based communications. For example, the UE 115-c may determine that the quasi-co-location source 340 is configured to be transmitted via a transmission path independent of the RIS 305 (e.g., over the communications link 315).

The UE 115-c may transmit an indication to the base station 105-b that the configuration for the first transmission configuration state (e.g., for RIS-based communications) conflicts with the quasi-co-location source 340 (e.g., for non RIS-based communications). For example, the UE 115-c may transmit an indication that the configuration for the first transmission configuration state (e.g., for RIS-based communications) conflicts with receiving the downlink channel transmission 335. In an example of the indication, the UE 115-c may transmit a beam failure indication associated with the quasi-co-location source 340. In another example of the indication, the UE 115-c may transmit a measurement report associated with the quasi-co-location source 340. In some aspects, the measurement report may be an RSRP report.

In some aspects, the UE 115-c may not expect to receive a configuration for a transmission configuration state for RIS-based communications in which the transmission configuration state indicates a quasi-co-location source for non RIS-based communications. In some other cases, the UE 115-c may not expect to receive a configuration for a transmission configuration state for non RIS-based communications in which the transmission configuration state indicates a quasi-co-location source for RIS-based communications. That is, the UE 115-c may assume that a configuration for a transmission configuration state for RIS-based communications indicates a quasi-co-location source for RIS-based communications, and the UE 115-c may assume that a configuration for a transmission configuration state for non RIS-based communications indicates a quasi-co-location source for non RIS-based communications. Accordingly, for example, when the UE 115-c determines (e.g., identifies) that a configuration for a transmission configuration state (e.g., for RIS-based communications) conflicts with a quasi-co-location source (e.g., for non RIS-based communications) indicated by the transmission configuration state, the UE 115-c may transmit an indication as described herein to inform the base station 105-b of the conflict.

In some examples, based on determining that the configuration for the first transmission configuration state (e.g., for RIS-based communications) conflicts with the quasi-co-location source 340 (e.g., for non RIS-based communications, the UE 115-c may fall back to (e.g., activate, reactivate) a transmission configuration state previously activated at the UE 115-c. The previous transmission configuration state, for example, may be a previous transmission configuration state for RIS-based communications (e.g., over the communications link 310). The previous transmission configuration state may, for example, indicate the quasi-co-location source 330 associated with the downlink channel transmission 335. In an example, the UE 115-c may receive the downlink channel transmission 335 via the RIS 305 based on the previous transmission configuration state.

Figure 4:
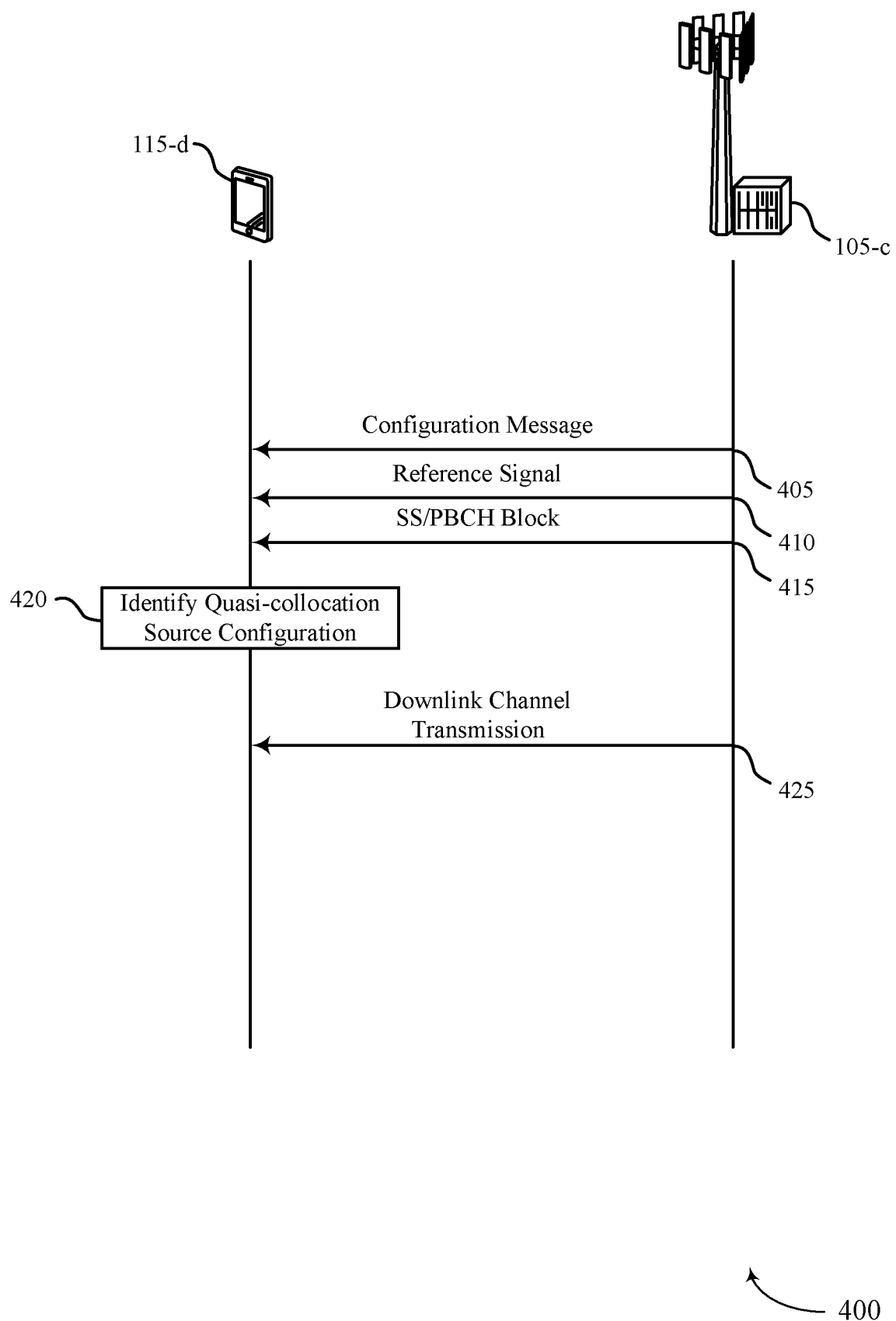
FIG. 4 illustrates an example of a process flow that supports downlink transmission configuration for reconfigurable intelligent surfaces in accordance with aspects of the present disclosure.

FIG. 4 illustrates an example of a process flow 400 that supports downlink transmission configuration for reconfigurable intelligent surfaces in accordance with aspects of the present disclosure. For example, process flow 400 may support downlink transmissions via reconfigurable intelligent surfaces based on a transmission configuration state.

In some examples, process flow 400 may implement aspects of wireless communications systems 100, 200, or 300. Further, process flow 400 may be implemented by a UE 115-d and a base station 105-c, which may be examples of corresponding devices described herein with reference to FIGS. 1 through 3. The UE 115-d and the base station 105-c may communicate over a RIS-based communications link (e.g., via a RIS) or a non RIS-based communications link (e.g., independent of a RIS).

In the following description of the process flow 400, the operations between UE 115-d and base station 105-c may be transmitted in a different order than the order shown, or the operations performed by base station 105-d and UE 115-c may be performed in different orders or at different times. Certain operations may also be left out of the process flow 400, or other operations may be added to the process flow 400. It is to be understood that while base station 105-c and UE 115-d are shown performing a number of the operations of process flow 400, any wireless device may perform the operations shown.

At 405, the UE 115-d may receive a configuration for a first transmission configuration state associated with receiving a first downlink channel transmission via one or more configurable surfaces (e.g., one or more RISs). The first transmission configuration state may indicate a first quasi-co-location source that is associated with transmission via the one or more configurable surfaces. In some aspects, the one or more configurable surfaces may include one or more reflective surfaces, one or more refractive surfaces, or both. In an example, at 405, the UE 115-d may receive the configuration via a configuration message (e.g., RRC signaling message).

In some examples, the first quasi-co-location source may include a downlink reference signal. In an example, at 410, the UE 115-d may receive the downlink reference signal via the one or more configurable surfaces. In some other examples, the downlink reference signal may include a set of channel state information reference signal resources.

In another example, the first quasi-co-location source may include one or more synchronization signal blocks associated with a broadcast channel. For example, at 415, the UE 115-d may receive the one or more synchronization signal blocks via the one or more configurable surfaces.

At 420, the UE 115-d may identify that the first quasi-co-location source is configured to be transmitted via the one or more configurable surfaces based on a format for a signal associated with the first quasi-co-location source.

At 425, the UE 115-d may receive the first downlink channel transmission via the one or more configurable surfaces based on the first transmission configuration state and the first quasi-co-location source.

Figure 5:
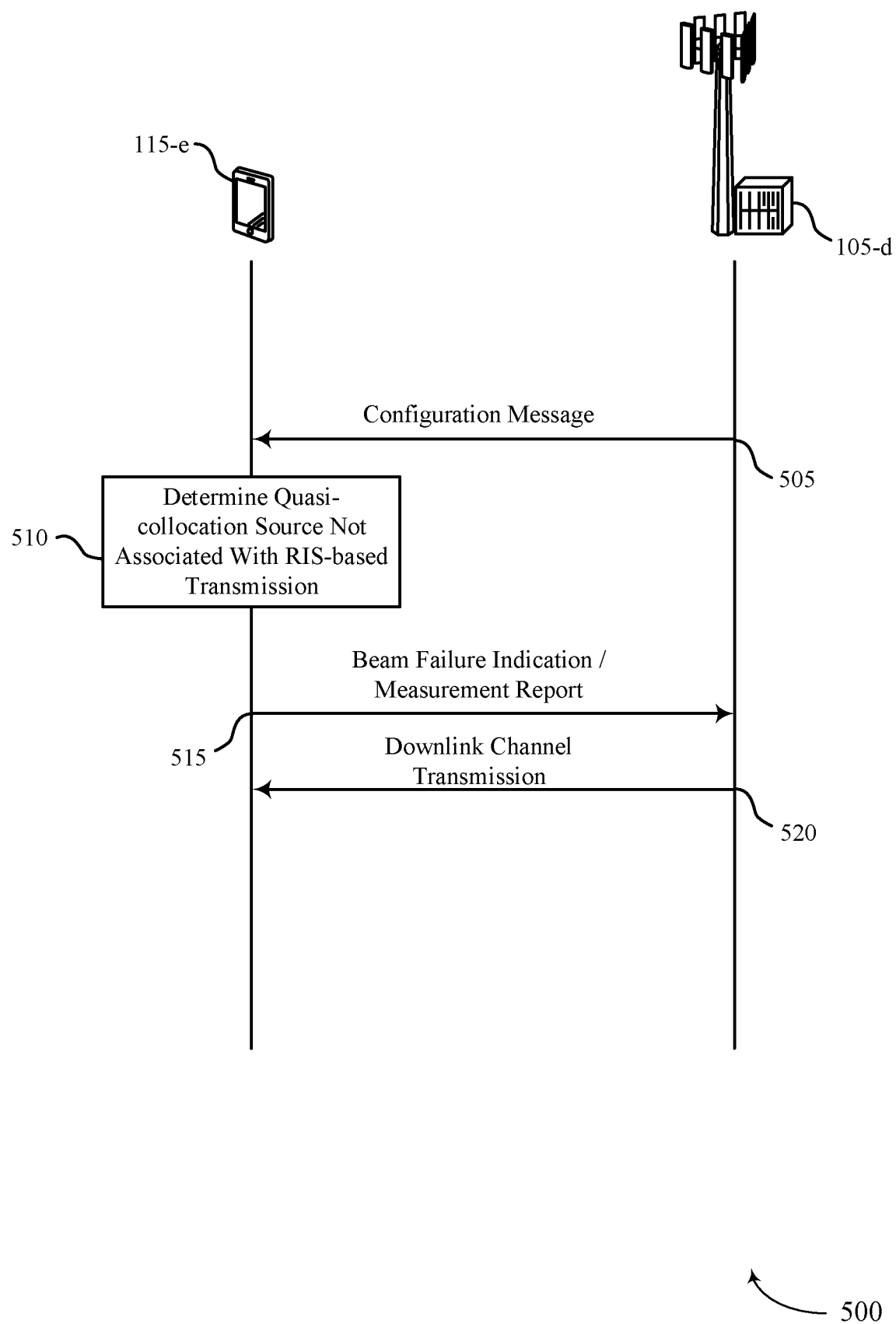
FIG. 5 illustrates an example of a process flow that supports downlink transmission configuration for reconfigurable intelligent surfaces in accordance with aspects of the present disclosure.

FIG. 5 illustrates an example of a process flow 500 that supports downlink transmission configuration for reconfigurable intelligent surfaces in accordance with aspects of the present disclosure. For example, process flow 400 may support downlink transmissions via reconfigurable intelligent surfaces based on a transmission configuration state.

In some examples, process flow 500 may implement aspects of wireless communications systems 100, 200, or 300. Further, process flow 500 may be implemented by a UE 115-e and a base station 105-d, which may be examples of corresponding devices described herein with reference to FIGS. 1 through 3. The UE 115-e and the base station 105-d may communicate over a RIS-based communications link (e.g., via a RIS) or a non RIS-based communications link (e.g., independent of a RIS).

In the following description of the process flow 500, the operations between UE 115-e and base station 105-d may be transmitted in a different order than the order shown, or the operations performed by base station 105-e and UE 115-d may be performed in different orders or at different times. Certain operations may also be left out of the process flow 500, or other operations may be added to the process flow 500. It is to be understood that while base station 105-d and UE 115-e are shown performing a number of the operations of process flow 500, any wireless device may perform the operations shown.

At 505, the UE 115-e may receive a configuration for a first transmission configuration state associated with receiving a downlink channel transmission from the base station 105-d via one or more configurable surfaces (e.g., one or more RISs). In some examples, the first transmission configuration state may indicate a first quasi-co-location source associated with the downlink channel transmission. In an example, at 505, the UE 115-e may receive the configuration via a configuration message (e.g., RRC signaling message).

At 510, the UE 115-e may determine that the first quasi-co-location source is not associated with transmission via the one or more configurable surfaces (e.g., not associated with RIS-based transmission).

At 515, the UE 115-e may transmit an indication that the configuration for the first transmission configuration state conflicts with the first quasi-co-location source, the receiving of the downlink channel transmission, or both. In some examples, transmitting the indication may include transmitting a beam failure indication associated with the first quasi-co-location source. In some other examples, transmitting the indication may include transmitting a measurement report (e.g., RSRP report) associated with the first quasi-co-location source.

At 520, the UE 115-e may communicate with the base station via the one or more configurable surfaces based on the determining that the first quasi-co-location source is not associated with transmission via the one or more configurable surfaces. For example, at 520, the UE 115-e may receive the downlink channel transmission via the one or more configurable surfaces based on a second transmission configuration state associated with receiving the downlink channel transmission via the one or more configurable surfaces. In some examples, the second transmission configuration state may indicate a second quasi-co-location source associated with the downlink channel transmission. In some aspects, the second transmission configuration state may include a previous transmission configuration state. In some other aspects, the second quasi-co-location source may be associated with transmission via the one or more configurable surfaces.

Figure 6:
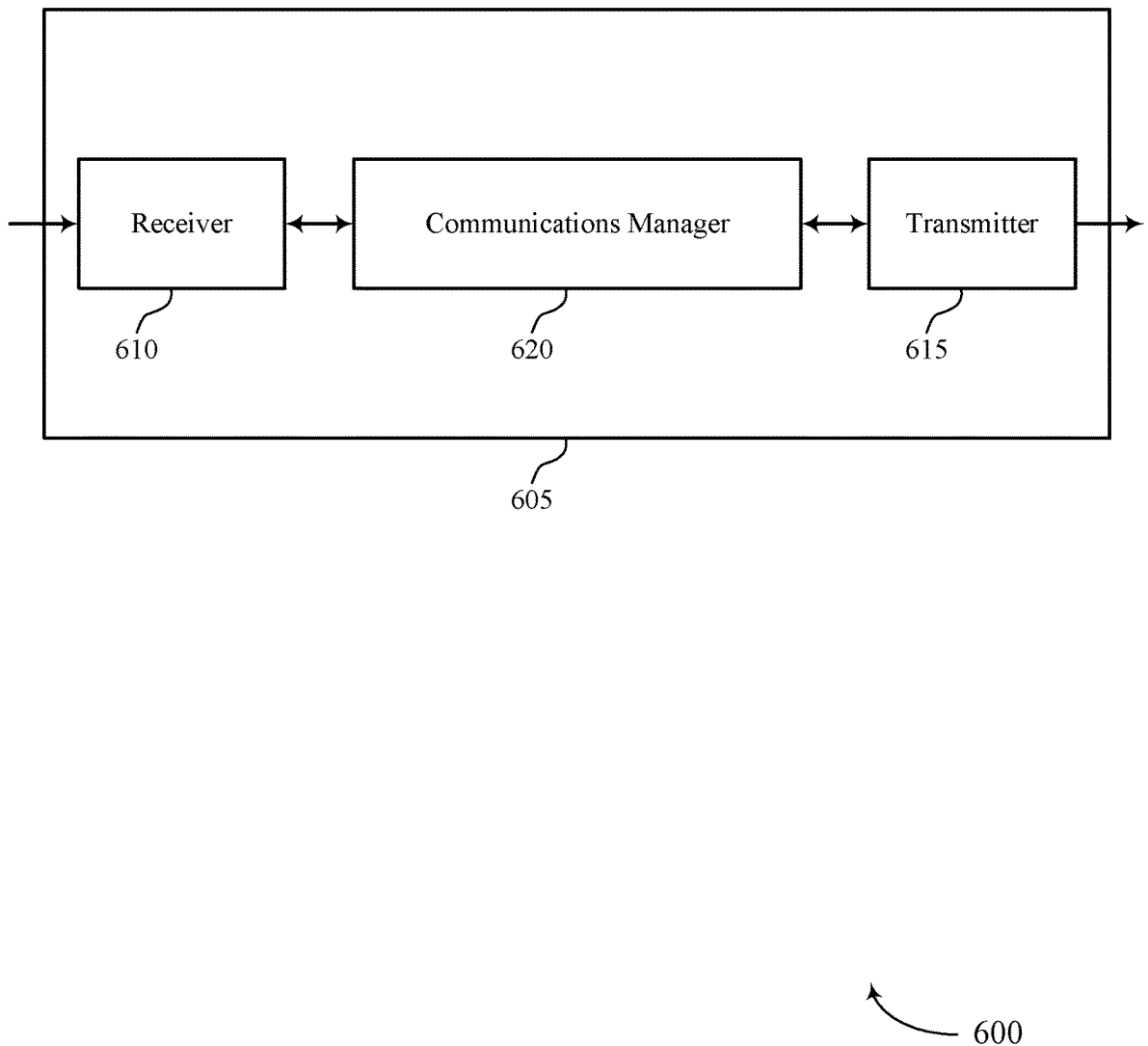
FIGS. 6 and 7 show block diagrams of devices that support downlink transmission configuration for reconfigurable intelligent surfaces in accordance with aspects of the present disclosure.

FIG. 6 shows a block diagram 600 of a device 605 that supports downlink transmission configuration for reconfigurable intelligent surfaces in accordance with aspects of the present disclosure. For example, the device 605 may support downlink transmissions via reconfigurable intelligent surfaces based on a transmission configuration state.

The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to downlink transmission configuration for reconfigurable intelligent surfaces). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to downlink transmission configuration for reconfigurable intelligent surfaces). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of downlink transmission configuration for reconfigurable intelligent surfaces as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for receiving a configuration for a first transmission configuration state associated with receiving a first downlink channel transmission via one or more configurable surfaces, the first transmission configuration state indicating a first quasi-co-location source that is associated with transmission via the one or more configurable surfaces. The communications manager 620 may be configured as or otherwise support a means for receiving the first downlink channel transmission via the one or more configurable surfaces based on the first transmission configuration state and the first quasi-co-location source.

Additionally or alternatively, the communications manager 620 may support wireless communication at a UE in accordance with examples as disclosed herein. For example, the communications manager 620 may be configured as or otherwise support a means for receiving a configuration for a first transmission configuration state associated with receiving a downlink channel transmission from a base station via one or more configurable surfaces, the first transmission configuration state indicating a first quasi-co-location source associated with the downlink channel transmission. The communications manager 620 may be configured as or otherwise support a means for determining that the first quasi-co-location source is not associated with transmission via the one or more configurable surfaces. The communications manager 620 may be configured as or otherwise support a means for communicating with the base station via the one or more configurable surfaces based on the determining that the first quasi-co-location source is not associated with transmission via the one or more configurable surfaces.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced processing, reduced power consumption, and more efficient utilization of communication resources.

Figure 7:
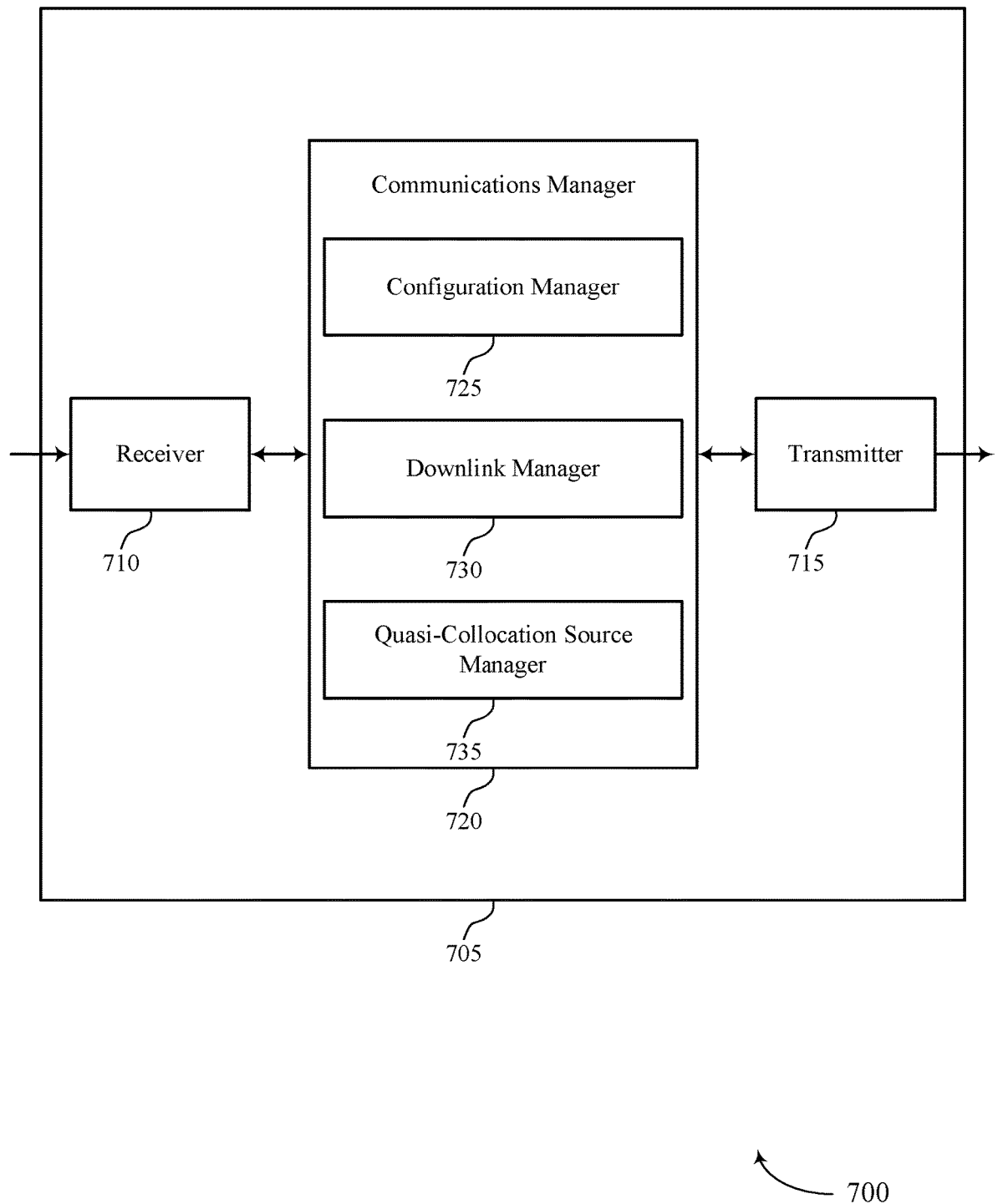

FIG. 7 shows a block diagram 700 of a device 705 that supports downlink transmission configuration for reconfigurable intelligent surfaces in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to downlink transmission configuration for reconfigurable intelligent surfaces). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to downlink transmission configuration for reconfigurable intelligent surfaces). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of downlink transmission configuration for reconfigurable intelligent surfaces as described herein. For example, the communications manager 720 may include a configuration manager 725, a downlink manager 730, a quasi-co-location source manager 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The configuration manager 725 may be configured as or otherwise support a means for receiving a configuration for a first transmission configuration state associated with receiving a first downlink channel transmission via one or more configurable surfaces, the first transmission configuration state indicating a first quasi-co-location source that is associated with transmission via the one or more configurable surfaces. The downlink manager 730 may be configured as or otherwise support a means for receiving the first downlink channel transmission via the one or more configurable surfaces based on the first transmission configuration state and the first quasi-co-location source.

Additionally or alternatively, the communications manager 720 may support wireless communication at a UE in accordance with examples as disclosed herein. The configuration manager 725 may be configured as or otherwise support a means for receiving a configuration for a first transmission configuration state associated with receiving a downlink channel transmission from a base station via one or more configurable surfaces, the first transmission configuration state indicating a first quasi-co-location source associated with the downlink channel transmission. The quasi-co-location source manager 735 may be configured as or otherwise support a means for determining that the first quasi-co-location source is not associated with transmission via the one or more configurable surfaces. The configuration manager 725 may be configured as or otherwise support a means for communicating with the base station via the one or more configurable surfaces based on the determining that the first quasi-co-location source is not associated with transmission via the one or more configurable surfaces.

Figure 8:
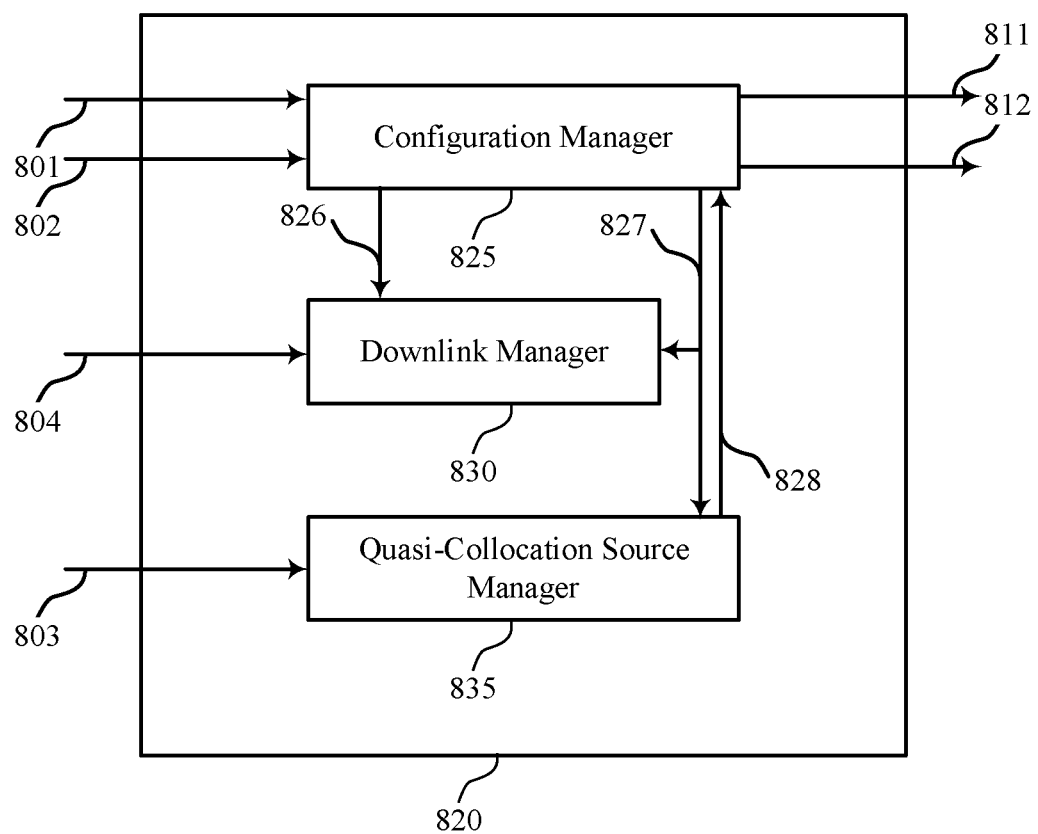
FIG. 8 shows a block diagram of a communications manager that supports downlink transmission configuration for reconfigurable intelligent surfaces in accordance with aspects of the present disclosure.

FIG. 8 shows a block diagram 800 of a communications manager 820 that supports downlink transmission configuration for reconfigurable intelligent surfaces in accordance with aspects of the present disclosure. The communications manager 820 may be an example of aspects of a communications manager 620, a communications manager 720, or both, as described herein. The communications manager 820, or various components thereof, may be an example of means for performing various aspects of downlink transmission configuration for reconfigurable intelligent surfaces as described herein. For example, the communications manager 820 may include a configuration manager 825, a downlink manager 830, a quasi-co-location source manager 835, or any combination thereof. Each of these components may communicate, directly or indirectly, with one another (e.g., via one or more buses).

The communications manager 820 may support wireless communication at a UE in accordance with examples as disclosed herein. The configuration manager 825 may be configured as or otherwise support a means for receiving a configuration (e.g., configuration 801) for a first transmission configuration state associated with receiving a first downlink channel transmission (e.g., downlink channel transmission 804) via one or more configurable surfaces, the first transmission configuration state indicating a first quasi-co-location source (e.g., quasi-co-location source 803) that is associated with transmission via the one or more configurable surfaces.

The downlink manager 830 may be configured as or otherwise support a means for receiving the first downlink channel transmission (e.g., downlink channel transmission 804) via the one or more configurable surfaces based on the first transmission configuration state and the first quasi-co-location source.

In some examples, the first quasi-co-location source includes a downlink reference signal, and the quasi-co-location source manager 835 may be configured as or otherwise support a means for receiving the downlink reference signal (e.g., quasi-co-location source 803) via the one or more configurable surfaces.

In some examples, the downlink reference signal includes a set of channel state information reference signal resources.

In some examples, the first quasi-co-location source includes one or more synchronization signal blocks associated with a broadcast channel, and the quasi-co-location source manager 835 may be configured as or otherwise support a means for receiving the one or more synchronization signal blocks (e.g., quasi-co-location source 803) via the one or more configurable surfaces.

In some examples, the quasi-co-location source manager 835 may be configured as or otherwise support a means for identifying that the first quasi-co-location source is configured to be transmitted via the one or more configurable surfaces based on a format for a signal associated with the first quasi-co-location source.

In some examples, the one or more configurable surfaces include one or more reflective surfaces, one or more refractive surfaces, or both.

In some examples, the configuration indicates a set of transmission configuration states, and the configuration manager 825 may be configured as or otherwise support a means for receiving control information (e.g., control information 802) including an indication that activates the first transmission configuration state or the second transmission configuration state.

In some examples, the configuration indicates a set of transmission configuration states, and the downlink manager 830 may be configured as or otherwise support a means for receiving the first downlink channel transmission (e.g., downlink channel transmission 804) according to the first transmission configuration state or receiving a second downlink channel transmission (e.g., downlink channel transmission 804) according to the second transmission configuration state, based on the indication. For example, the downlink manager 830 may receive an indication 826 of the configuration indicating the set of transmission configuration states from the configuration manager 825.

In some examples, the second quasi-co-location source includes a downlink reference signal, and the quasi-co-location source manager 835 may be configured as or otherwise support a means for receiving the downlink reference signal (e.g., quasi-co-location source 803) via a transmission path excluding the one or more configurable surfaces, based on the indication.

In some examples, the control information further indicates a set of resources associated with receiving the first downlink channel transmission or the second downlink channel transmission.

In some examples, the configuration manager 825 may be configured as or otherwise support a means for transmitting an activation request (e.g., activation request 811) indicating the first transmission configuration state or the second transmission configuration state, where the control information (e.g., control information 802) is received based on the activation request.

Additionally or alternatively, the communications manager 820 may support wireless communication at a UE in accordance with examples as disclosed herein. In some examples, the configuration manager 825 may be configured as or otherwise support a means for receiving a configuration (e.g., configuration 801) for a first transmission configuration state associated with receiving a downlink channel transmission (e.g., downlink channel transmission 804) from a base station via one or more configurable surfaces, the first transmission configuration state indicating a first quasi-co-location source (e.g., quasi-co-location source 803) associated with the downlink channel transmission. In some examples, the configuration manager 825 may transmit an indication 827 of the first transmission configuration state to the quasi-co-location manager 835.

The quasi-co-location source manager 835 may be configured as or otherwise support a means for determining that the first quasi-co-location source is not associated with transmission via the one or more configurable surfaces. In some examples, the configuration manager 825 may be configured as or otherwise support a means for communicating with the base station via the one or more configurable surfaces based on the determining that the first quasi-co-location source is not associated with transmission via the one or more configurable surfaces. In some examples, the quasi-co-location source manager 835 may transmit an indication 828 to the configuration manager 825 that the first quasi-co-location source is not associated with transmission via the one or more configurable surfaces.

In some examples, the configuration manager 825 may be configured as or otherwise support a means for transmitting an indication (e.g., indication 812) that the configuration for the first transmission configuration state conflicts with the first quasi-co-location source, the receiving of the downlink channel transmission, or both.

In some examples, transmitting the indication (e.g., indication 812) includes transmitting a beam failure indication associated with the first quasi-co-location source.

In some examples, transmitting the indication (e.g., indication 812) includes transmitting a measurement report associated with the first quasi-co-location source.

In some examples, the downlink manager 830 may be configured as or otherwise support a means for receiving the downlink channel transmission (e.g., downlink channel transmission 804) via the one or more configurable surfaces based on a second transmission configuration state associated with receiving the downlink channel transmission via the one or more configurable surfaces, the second transmission configuration state indicating a second quasi-co-location source (e.g., quasi-co-location source 803) associated with the downlink channel transmission. In some examples, the configuration manager 825 may transmit an indication 827 of the second transmission configuration state to the downlink manager 830.

In some examples, the second transmission configuration state includes a previous transmission configuration state.

In some examples, the second quasi-co-location source is associated with transmission via the one or more configurable surfaces.

Figure 9:
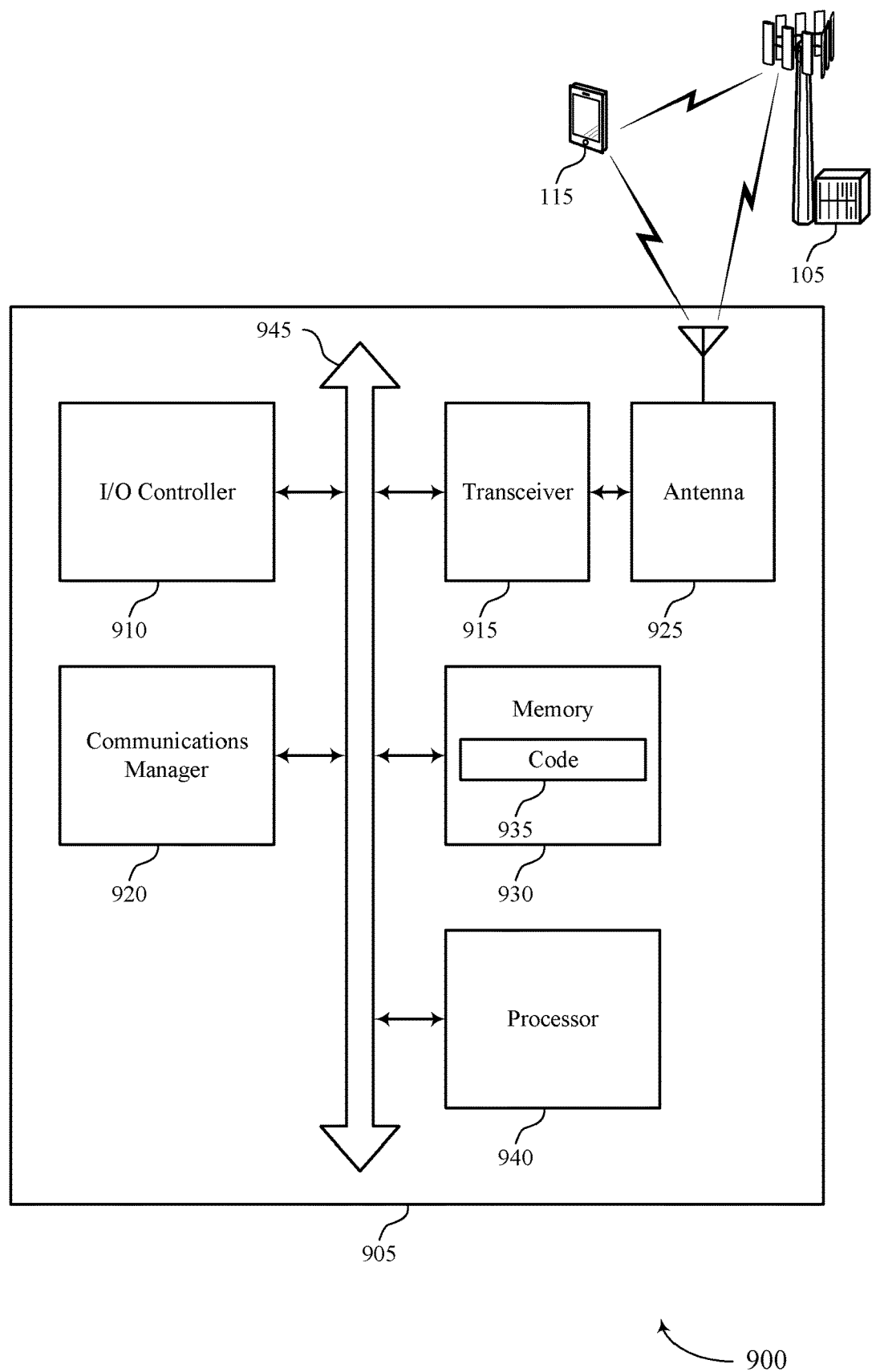
FIG. 9 shows a diagram of a system including a device that supports downlink transmission configuration for reconfigurable intelligent surfaces in accordance with aspects of the present disclosure.

FIG. 9 shows a diagram of a system 900 including a device 905 that supports downlink transmission configuration for reconfigurable intelligent surfaces in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting downlink transmission configuration for reconfigurable intelligent surfaces). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for receiving a configuration for a first transmission configuration state associated with receiving a first downlink channel transmission via one or more configurable surfaces, the first transmission configuration state indicating a first quasi-co-location source that is associated with transmission via the one or more configurable surfaces. The communications manager 920 may be configured as or otherwise support a means for receiving the first downlink channel transmission via the one or more configurable surfaces based on the first transmission configuration state and the first quasi-co-location source.

Additionally or alternatively, the communications manager 920 may support wireless communication at a UE in accordance with examples as disclosed herein. For example, the communications manager 920 may be configured as or otherwise support a means for receiving a configuration for a first transmission configuration state associated with receiving a downlink channel transmission from a base station via one or more configurable surfaces, the first transmission configuration state indicating a first quasi-co-location source associated with the downlink channel transmission. The communications manager 920 may be configured as or otherwise support a means for determining that the first quasi-co-location source is not associated with transmission via the one or more configurable surfaces. The communications manager 920 may be configured as or otherwise support a means for communicating with the base station via the one or more configurable surfaces based on the determining that the first quasi-co-location source is not associated with transmission via the one or more configurable surfaces.

By including or configuring the communications manager 920 in accordance with examples as described herein, the device 905 may support techniques for improved communication reliability, reduced latency, improved user experience related to reduced processing, reduced power consumption, more efficient utilization of communication resources, improved coordination between devices, increased battery life, and improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of downlink transmission configuration for reconfigurable intelligent surfaces as described herein, or the processor 940 and the memory 930 may be otherwise configured to perform or support such operations.

Figure 10:
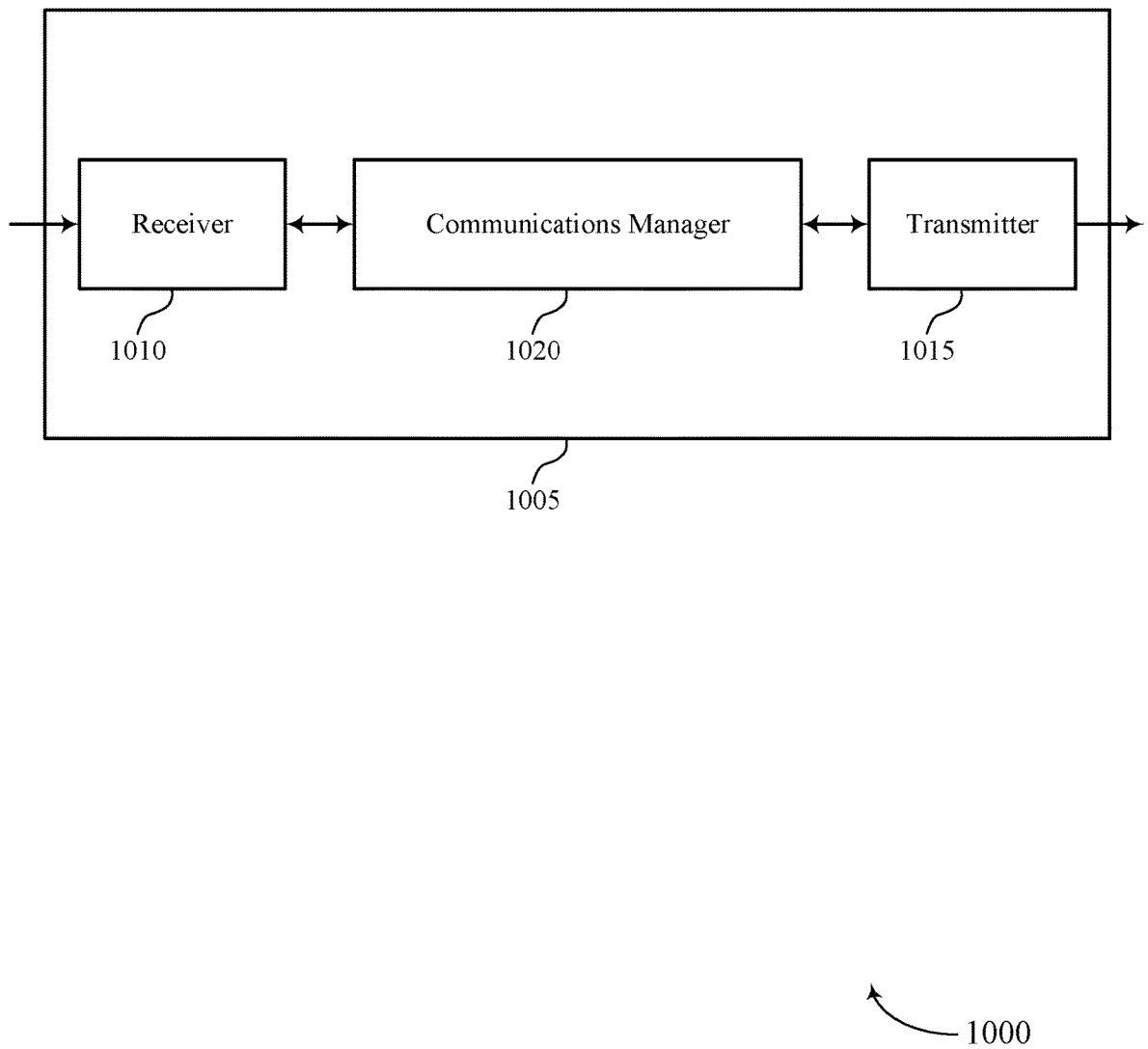
FIGS. 10 and 11 show block diagrams of devices that support downlink transmission configuration for reconfigurable intelligent surfaces in accordance with aspects of the present disclosure.

FIG. 10 shows a block diagram 1000 of a device 1005 that supports downlink transmission configuration for reconfigurable intelligent surfaces in accordance with aspects of the present disclosure. For example, the device 1005 may support downlink transmissions via reconfigurable intelligent surfaces based on a transmission configuration state.

The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to downlink transmission configuration for reconfigurable intelligent surfaces). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to downlink transmission configuration for reconfigurable intelligent surfaces). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of downlink transmission configuration for reconfigurable intelligent surfaces as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. For example, the communications manager 1020 may be configured as or otherwise support a means for transmitting a configuration for a first transmission configuration state associated with receiving a first downlink channel transmission via one or more configurable surfaces, the first transmission configuration state indicating a first quasi-co-location source that is associated with transmission via the one or more configurable surfaces. The communications manager 1020 may be configured as or otherwise support a means for transmitting the first downlink channel transmission via the one or more configurable surfaces based on the first transmission configuration state and the first quasi-co-location source.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for reduced processing, reduced power consumption, and efficient utilization of communication resources.

Figure 11:
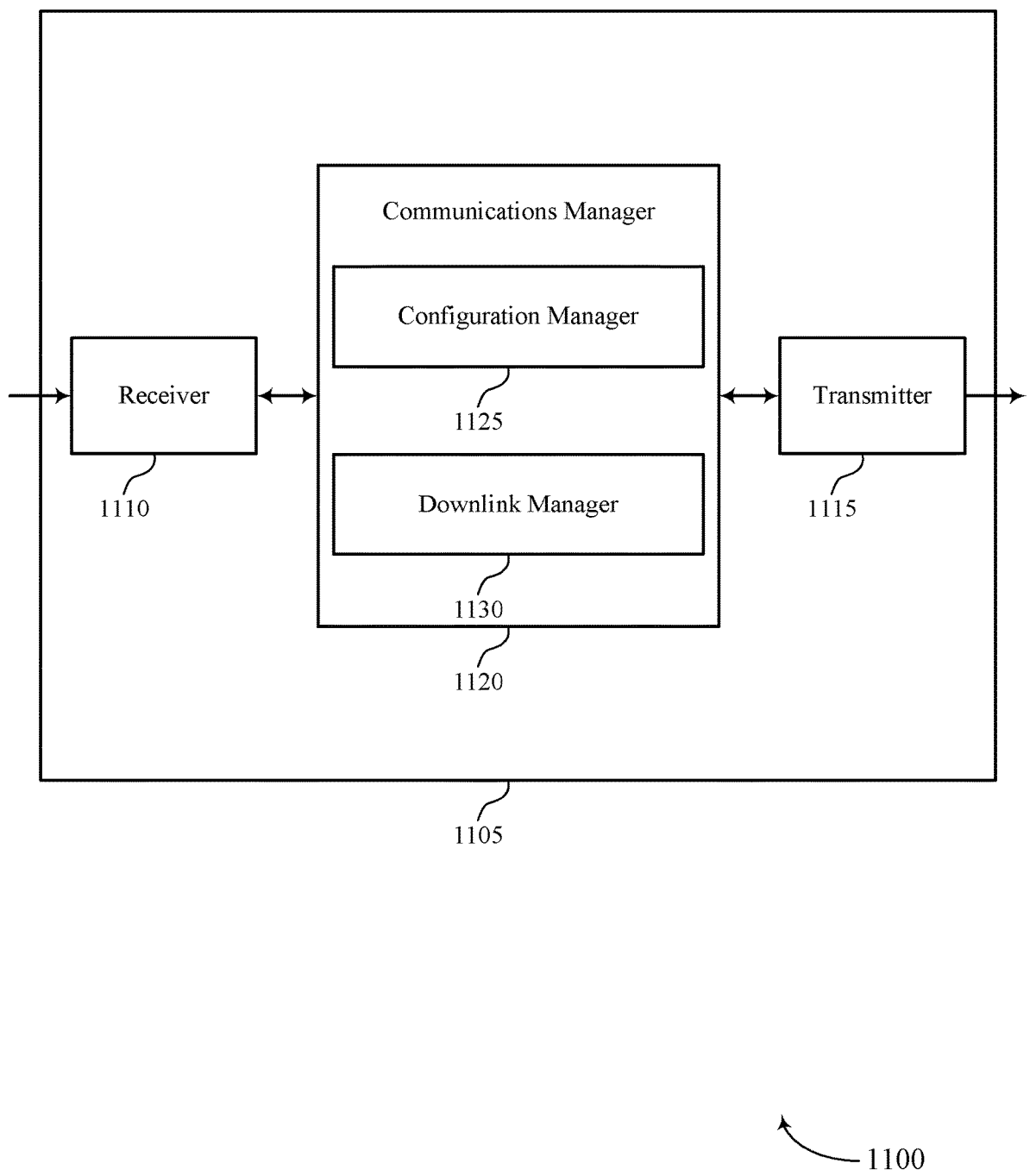

FIG. 11 shows a block diagram 1100 of a device 1105 that supports downlink transmission configuration for reconfigurable intelligent surfaces in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to downlink transmission configuration for reconfigurable intelligent surfaces). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to downlink transmission configuration for reconfigurable intelligent surfaces). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of downlink transmission configuration for reconfigurable intelligent surfaces as described herein. For example, the communications manager 1120 may include a configuration manager 1125 a downlink manager 1130, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a base station in accordance with examples as disclosed herein. The configuration manager 1125 may be configured as or otherwise support a means for transmitting a configuration for a first transmission configuration state associated with receiving a first downlink channel transmission via one or more configurable surfaces, the first transmission configuration state indicating a first quasi-co-location source that is associated with transmission via the one or more configurable surfaces. The downlink manager 1130 may be configured as or otherwise support a means for transmitting the first downlink channel transmission via the one or more configurable surfaces based on the first transmission configuration state and the first quasi-co-location source.

Figure 12:
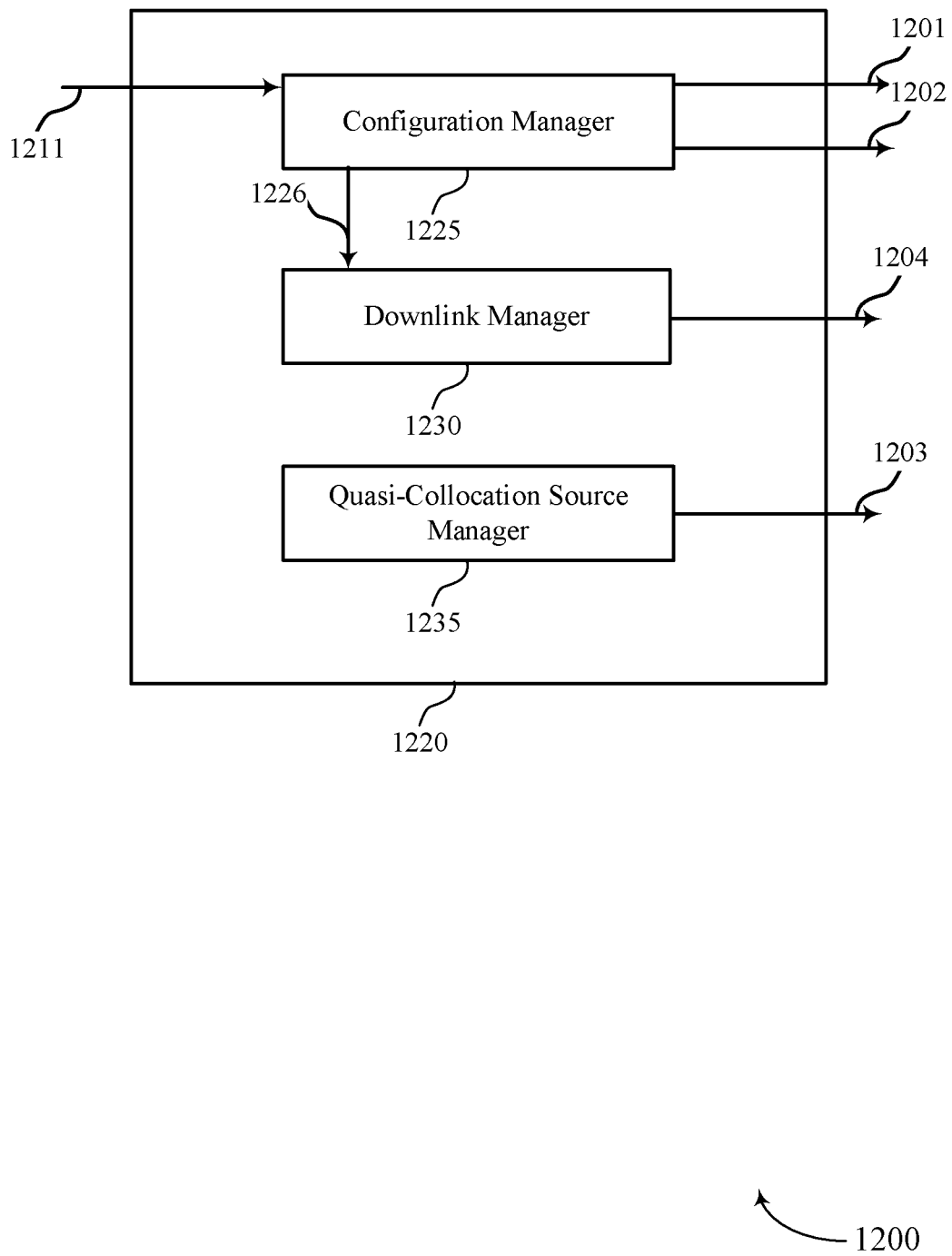
FIG. 12 shows a block diagram of a communications manager that supports downlink transmission configuration for reconfigurable intelligent surfaces in accordance with aspects of the present disclosure.

FIG. 12 shows a block diagram 1200 of a communications manager 1220 that supports downlink transmission configuration for reconfigurable intelligent surfaces in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of downlink transmission configuration for reconfigurable intelligent surfaces as described herein. For example, the communications manager 1220 may include a configuration manager 1225, a downlink manager 1230, a quasi-co-location source manager 1235, or any combination thereof. Each of these components may communicate, directly or indirectly, with one another (e.g., via one or more buses).

The communications manager 1220 may support wireless communication at a base station in accordance with examples as disclosed herein. The configuration manager 1225 may be configured as or otherwise support a means for transmitting a configuration (e.g., configuration 1201) for a first transmission configuration state associated with receiving a first downlink channel transmission (e.g., downlink channel transmission 1204) via one or more configurable surfaces, the first transmission configuration state indicating a first quasi-co-location source (e.g., quasi-co-location source 1203) that is associated with transmission via the one or more configurable surfaces.

The downlink manager 1230 may be configured as or otherwise support a means for transmitting the first downlink channel transmission (e.g., downlink channel transmission 1204) via the one or more configurable surfaces based on the first transmission configuration state and the first quasi-co-location source.

In some examples, the first quasi-co-location source includes a downlink reference signal, and the downlink manager 1230 may be configured as or otherwise support a means for transmitting the downlink reference signal (e.g., downlink channel transmission 1204) via the one or more configurable surfaces.

In some examples, the downlink reference signal includes a set of channel state information reference signal resources.

In some examples, the first quasi-co-location source includes one or more synchronization signal blocks associated with a broadcast channel, and the quasi-co-location source manager 1235 may be configured as or otherwise support a means for transmitting the one or more synchronization signal blocks (e.g., quasi-co-location source 1203) via the one or more configurable surfaces.

In some examples, the quasi-co-location source manager 1235 may be configured as or otherwise support a means for transmitting a signal associated with the first quasi-co-location source having a format associated with transmission via the one or more configurable surfaces. In some examples, the configuration manager 1225 may transmit an indication 1227 of the first transmission configuration state to the quasi-co-location manager 1235.

In some examples, the one or more configurable surfaces include one or more reflective surfaces, one or more refractive surfaces, or both.

In some examples, the configuration indicates a set of transmission configuration states, and the configuration manager 1225 may be configured as or otherwise support a means for transmitting control information (e.g., control information 1202) including an indication that activates the first transmission configuration state or the second transmission configuration state.

In some examples, the configuration indicates a set of transmission configuration states, and the downlink manager 1230 may be configured as or otherwise support a means for transmitting the first downlink channel transmission (e.g., downlink channel transmission 1204) according to the first transmission configuration state or transmitting a second downlink channel transmission (e.g., downlink channel transmission 1204) according to the second transmission configuration state, based on the indication. For example, the downlink manager 1230 may receive an indication 1226 of the configuration indicating the set of transmission configuration states from the configuration manager 1225.

In some examples, the second quasi-co-location source includes a downlink reference signal, and the quasi-co-location source manager 1235 may be configured as or otherwise support a means for transmitting the downlink reference signal (e.g., quasi-co-location source 1203) via a transmission path excluding the one or more configurable surfaces.

In some examples, the control information further indicates a set of resources associated with receiving the first downlink channel transmission or the second downlink channel transmission.

In some examples, the configuration manager 1225 may be configured as or otherwise support a means for receiving an activation request (e.g., activation request 1211) indicating the first transmission configuration state or the second transmission configuration state, where the control information (e.g., control information 1202) is transmitted based on the activation request.

Figure 13:
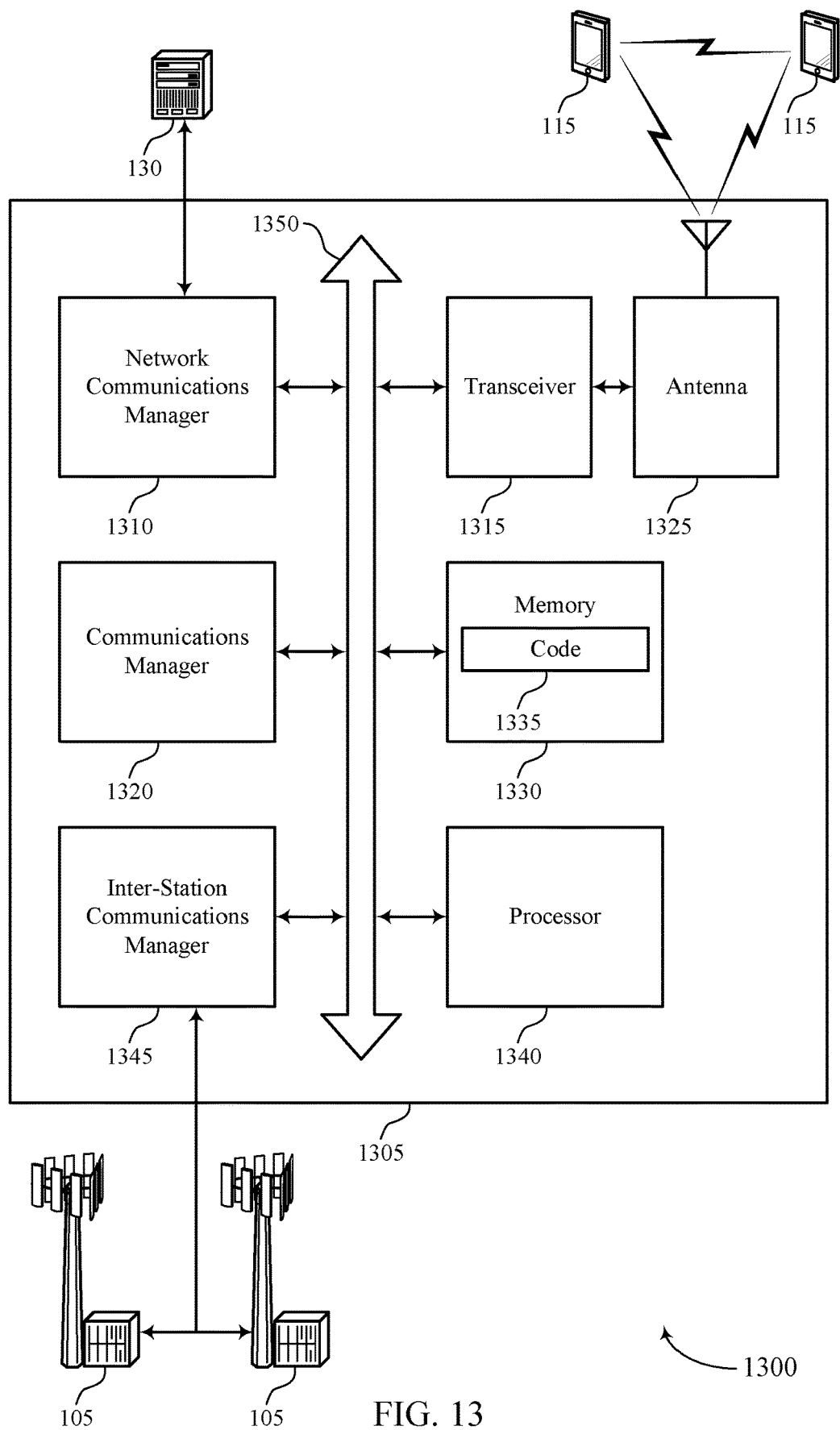
FIG. 13 shows a diagram of a system including a device that supports downlink transmission configuration for reconfigurable intelligent surfaces in accordance with aspects of the present disclosure.

FIG. 13 shows a diagram of a system 1300 including a device 1305 that supports downlink transmission configuration for reconfigurable intelligent surfaces in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting downlink transmission configuration for reconfigurable intelligent surfaces). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a base station in accordance with examples as disclosed herein. For example, the communications manager 1320 may be configured as or otherwise support a means for transmitting a configuration for a first transmission configuration state associated with receiving a first downlink channel transmission via one or more configurable surfaces, the first transmission configuration state indicating a first quasi-co-location source that is associated with transmission via the one or more configurable surfaces. The communications manager 1320 may be configured as or otherwise support a means for transmitting the first downlink channel transmission via the one or more configurable surfaces based on the first transmission configuration state and the first quasi-co-location source.

By including or configuring the communications manager 1320 in accordance with examples as described herein, the device 1305 may support techniques for improved communication reliability, reduced latency, improved user experience related to reduced processing, reduced power consumption, more efficient utilization of communication resources, improved coordination between devices, increased battery life, and improved utilization of processing capability.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of downlink transmission configuration for reconfigurable intelligent surfaces as described herein, or the processor 1340 and the memory 1330 may be otherwise configured to perform or support such operations.

Figure 14:
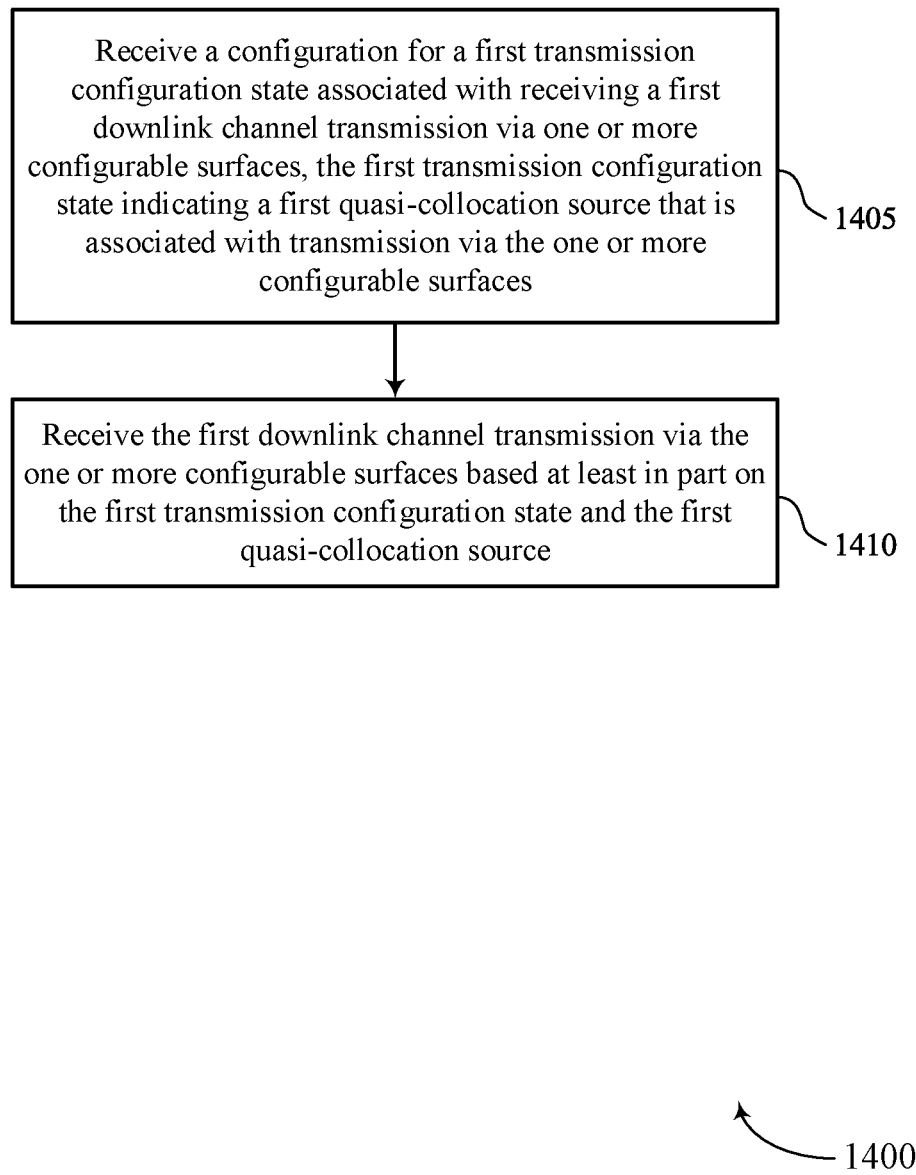
FIGS. 14 through 18 show flowcharts illustrating methods that support downlink transmission configuration for reconfigurable intelligent surfaces in accordance with aspects of the present disclosure.

FIG. 14 shows a flowchart illustrating a method 1400 that supports downlink transmission configuration for reconfigurable intelligent surfaces in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving a configuration for a first transmission configuration state associated with receiving a first downlink channel transmission via one or more configurable surfaces, the first transmission configuration state indicating a first quasi-co-location source that is associated with transmission via the one or more configurable surfaces. The operations of 1405 may be performed in accordance with examples as disclosed herein. In some examples, aspects of the operations of 1405 may be performed by a configuration manager 825 as described with reference to FIG. 8.

At 1410, the method may include receiving the first downlink channel transmission via the one or more configurable surfaces based on the first transmission configuration state and the first quasi-co-location source. The operations of 1410 may be performed in accordance with examples as disclosed herein. In some examples, aspects of the operations of 1410 may be performed by a downlink manager 830 as described with reference to FIG. 8.

Figure 15:
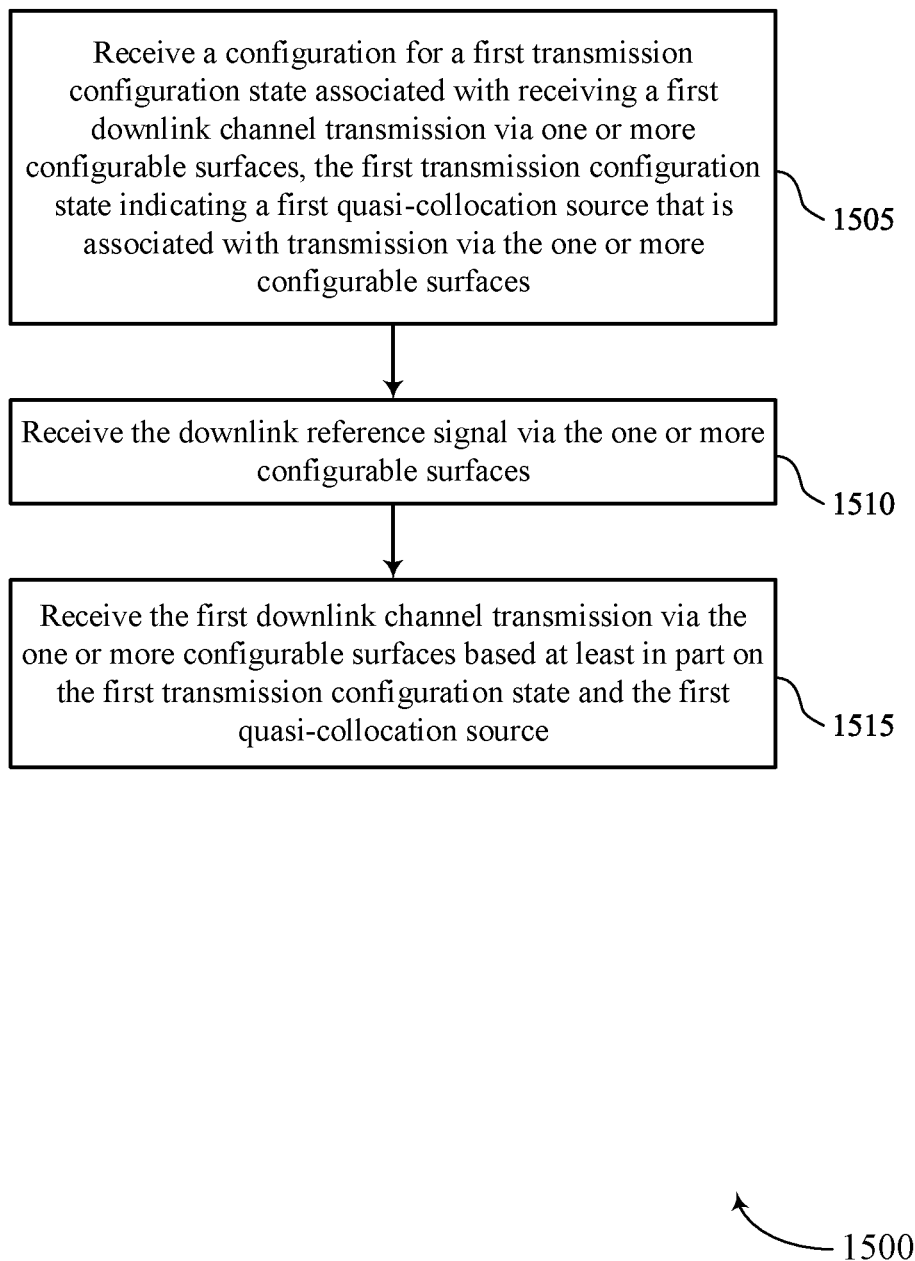

FIG. 15 shows a flowchart illustrating a method 1500 that supports downlink transmission configuration for reconfigurable intelligent surfaces in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include receiving a configuration for a first transmission configuration state associated with receiving a first downlink channel transmission via one or more configurable surfaces, the first transmission configuration state indicating a first quasi-co-location source that is associated with transmission via the one or more configurable surfaces. The operations of 1505 may be performed in accordance with examples as disclosed herein. In some examples, aspects of the operations of 1505 may be performed by a configuration manager 825 as described with reference to FIG. 8.

At 1510, the method may include receiving the downlink reference signal via the one or more configurable surfaces. The operations of 1510 may be performed in accordance with examples as disclosed herein. In some examples, aspects of the operations of 1510 may be performed by a downlink manager 830 as described with reference to FIG. 8.

At 1515, the method may include receiving the first downlink channel transmission via the one or more configurable surfaces based on the first transmission configuration state and the first quasi-co-location source. The operations of 1515 may be performed in accordance with examples as disclosed herein. In some examples, aspects of the operations of 1515 may be performed by a downlink manager 830 as described with reference to FIG. 8.

Figure 16:
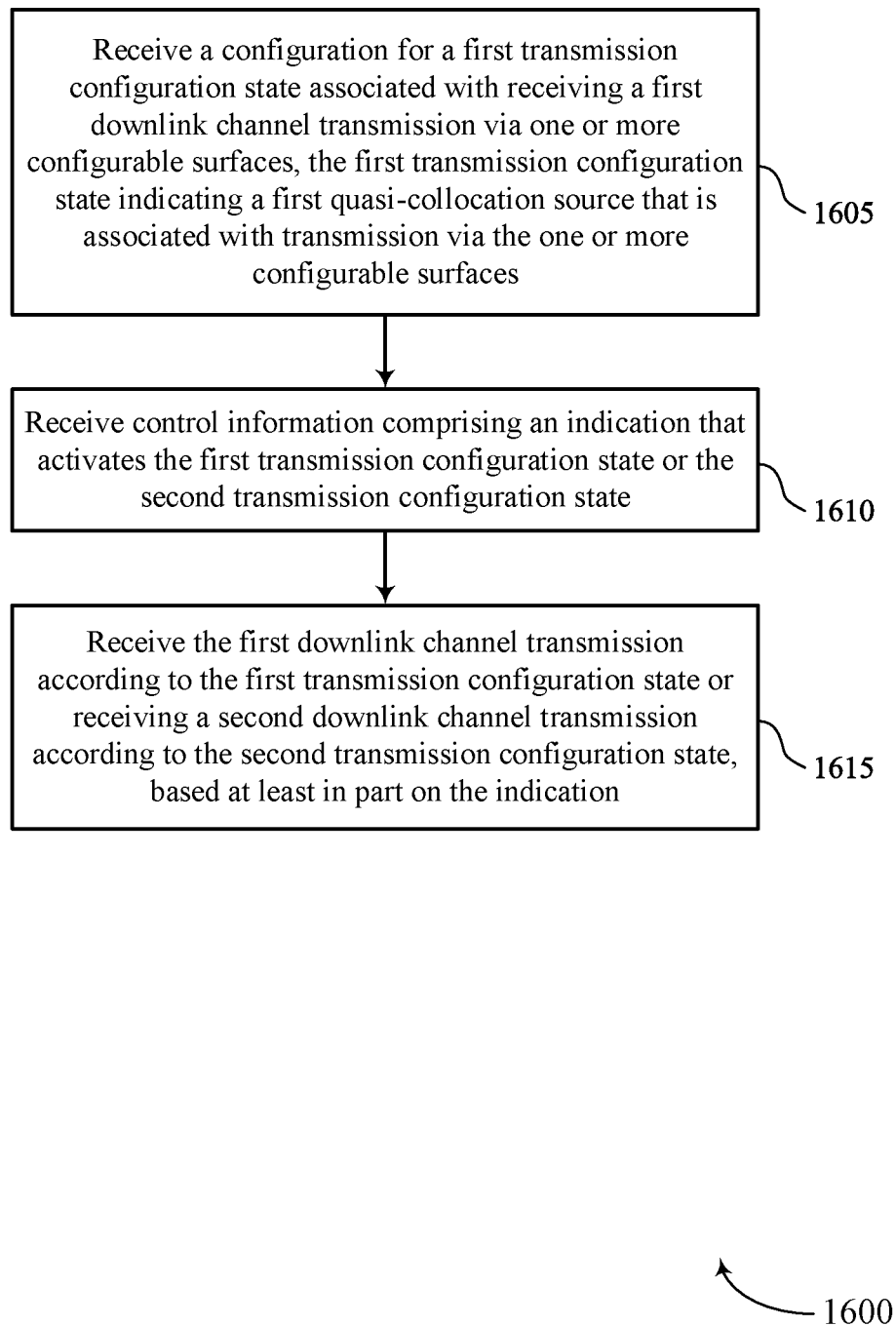

FIG. 16 shows a flowchart illustrating a method 1600 that supports downlink transmission configuration for reconfigurable intelligent surfaces in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include receiving a configuration for a first transmission configuration state associated with receiving a first downlink channel transmission via one or more configurable surfaces, the first transmission configuration state indicating a first quasi-co-location source that is associated with transmission via the one or more configurable surfaces. The operations of 1605 may be performed in accordance with examples as disclosed herein. In some examples, aspects of the operations of 1605 may be performed by a configuration manager 825 as described with reference to FIG. 8.

At 1610, the method may include receiving control information including an indication that activates the first transmission configuration state or the second transmission configuration state. The operations of 1610 may be performed in accordance with examples as disclosed herein. In some examples, aspects of the operations of 1610 may be performed by a configuration manager 825 as described with reference to FIG. 8.

At 1615, the method may include receiving the first downlink channel transmission according to the first transmission configuration state or receiving a second downlink channel transmission according to the second transmission configuration state, based on the indication. The operations of 1615 may be performed in accordance with examples as disclosed herein. In some examples, aspects of the operations of 1615 may be performed by a downlink manager 830 as described with reference to FIG. 8.

Figure 17:
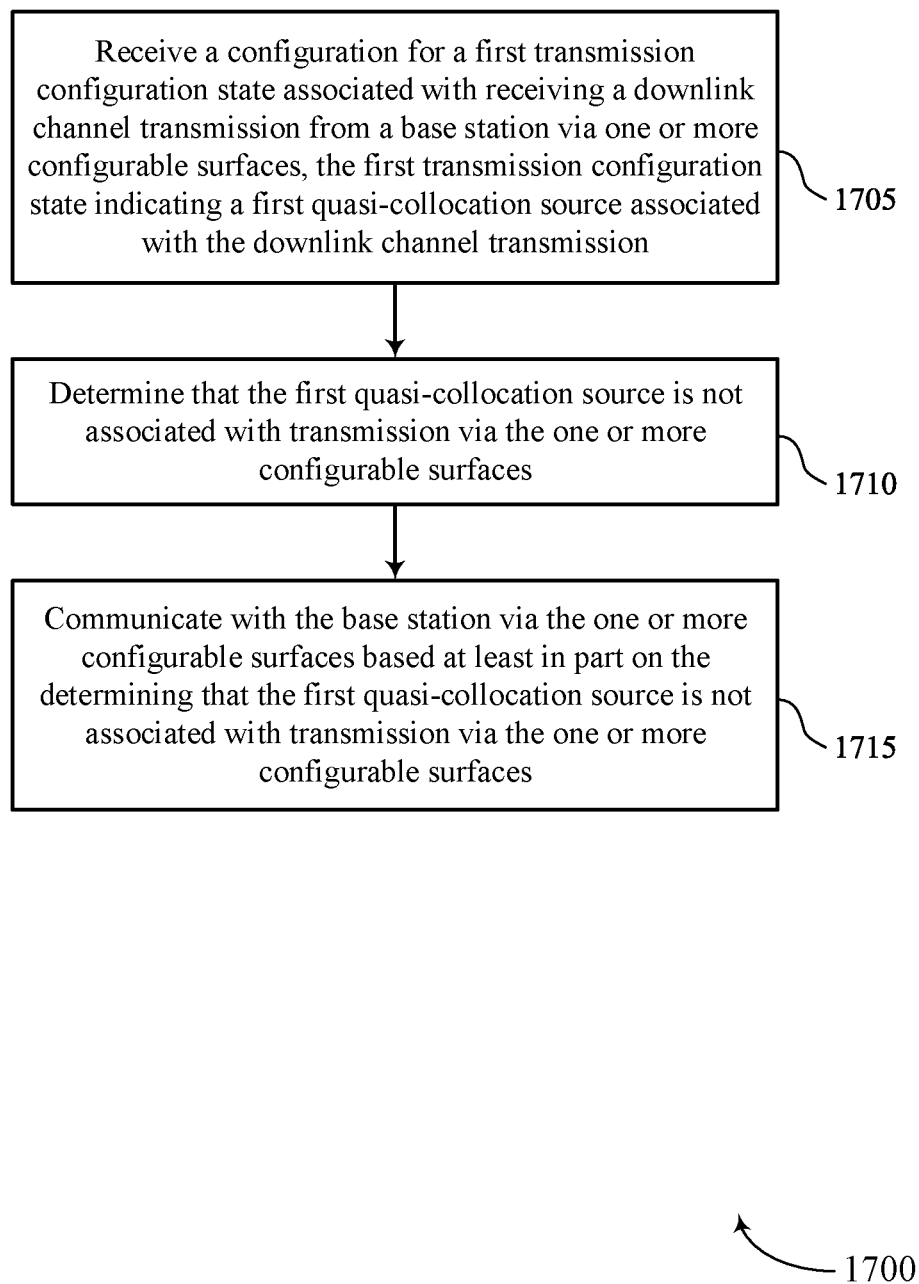

FIG. 17 shows a flowchart illustrating a method 1700 that supports downlink transmission configuration for reconfigurable intelligent surfaces in accordance with aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1705, the method may include receiving a configuration for a first transmission configuration state associated with receiving a downlink channel transmission from a base station via one or more configurable surfaces, the first transmission configuration state indicating a first quasi-co-location source associated with the downlink channel transmission. The operations of 1705 may be performed in accordance with examples as disclosed herein. In some examples, aspects of the operations of 1705 may be performed by a configuration manager 825 as described with reference to FIG. 8.

At 1710, the method may include determining that the first quasi-co-location source is not associated with transmission via the one or more configurable surfaces. The operations of 1710 may be performed in accordance with examples as disclosed herein. In some examples, aspects of the operations of 1710 may be performed by a quasi-co-location source manager 835 as described with reference to FIG. 8.

At 1715, the method may include communicating with the base station via the one or more configurable surfaces based on the determining that the first quasi-co-location source is not associated with transmission via the one or more configurable surfaces. The operations of 1715 may be performed in accordance with examples as disclosed herein. In some examples, aspects of the operations of 1715 may be performed by a configuration manager 825 as described with reference to FIG. 8.

Figure 18:
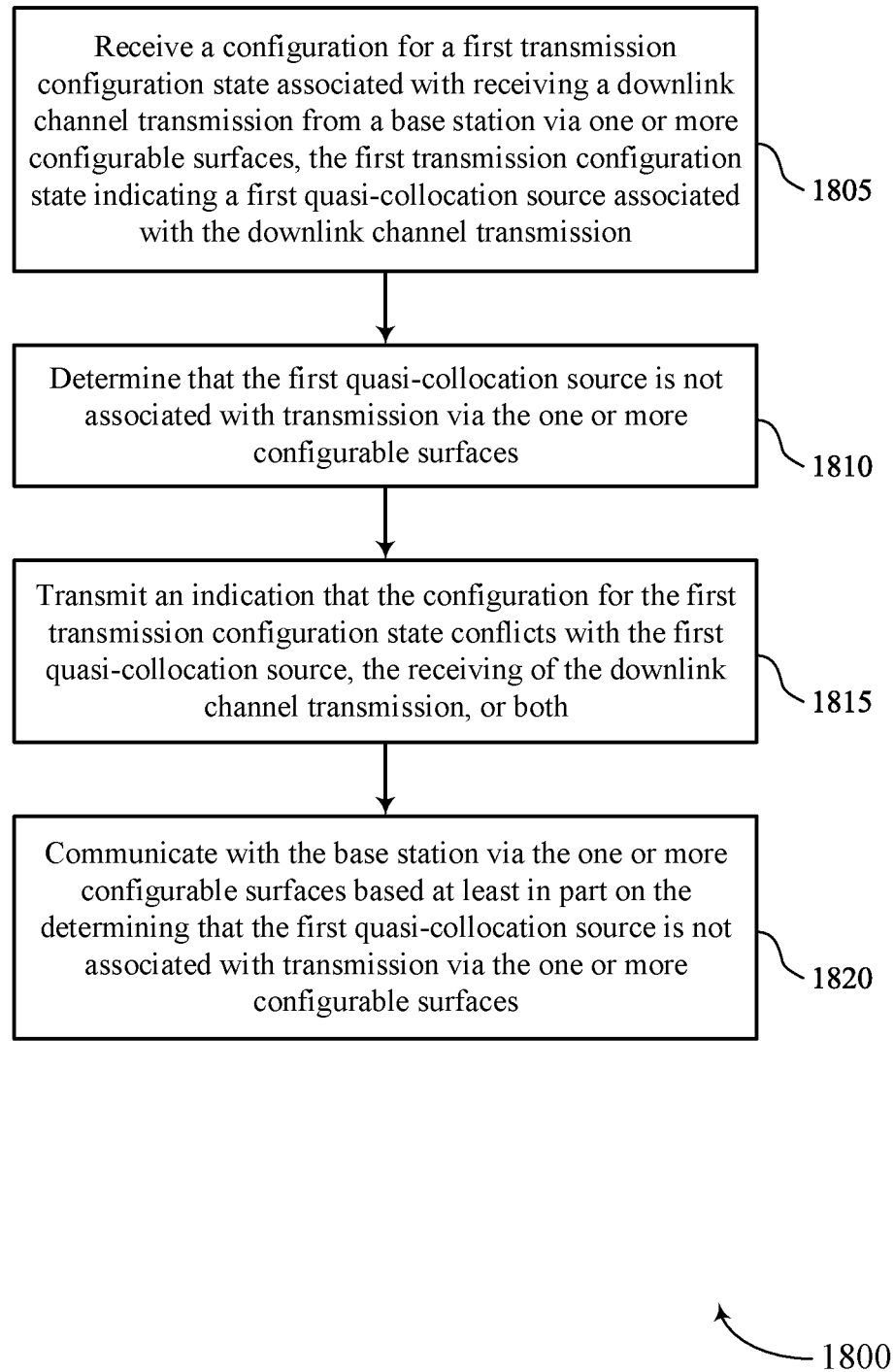

FIG. 18 shows a flowchart illustrating a method 1800 that supports downlink transmission configuration for reconfigurable intelligent surfaces in accordance with aspects of the present disclosure. The operations of the method 1800 may be implemented by a UE or its components as described herein. For example, the operations of the method 1800 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1805, the method may include receiving a configuration for a first transmission configuration state associated with receiving a downlink channel transmission from a base station via one or more configurable surfaces, the first transmission configuration state indicating a first quasi-co-location source associated with the downlink channel transmission. The operations of 1805 may be performed in accordance with examples as disclosed herein. In some examples, aspects of the operations of 1805 may be performed by a configuration manager 825 as described with reference to FIG. 8.

At 1810, the method may include determining that the first quasi-co-location source is not associated with transmission via the one or more configurable surfaces. The operations of 1810 may be performed in accordance with examples as disclosed herein. In some examples, aspects of the operations of 1810 may be performed by a quasi-co-location source manager 835 as described with reference to FIG. 8.

At 1815, the method may include transmitting an indication that the configuration for the first transmission configuration state conflicts with the first quasi-co-location source, the receiving of the downlink channel transmission, or both. The operations of 1815 may be performed in accordance with examples as disclosed herein. In some examples, aspects of the operations of 1815 may be performed by a configuration manager 825 as described with reference to FIG. 8.

At 1820, the method may include communicating with the base station via the one or more configurable surfaces based on the determining that the first quasi-co-location source is not associated with transmission via the one or more configurable surfaces. The operations of 1820 may be performed in accordance with examples as disclosed herein. In some examples, aspects of the operations of 1820 may be performed by a configuration manager 825 as described with reference to FIG. 8.

The following provides an overview of aspects of the present disclosure:

Aspect 1: A method for wireless communication at a UE, comprising: receiving a configuration for a first transmission configuration state associated with receiving a first downlink channel transmission via one or more configurable surfaces, the first transmission configuration state indicating a first quasi-colocation source that is associated with transmission via the one or more configurable surfaces; and receiving the first downlink channel transmission via the one or more configurable surfaces based at least in part on the first transmission configuration state and the first quasi-colocation source.

Aspect 2: The method of aspect 1, wherein the first quasi-colocation source comprises a downlink reference signal, the method further comprising: receiving the downlink reference signal via the one or more configurable surfaces.

Aspect 3: The method of aspect 2, wherein the downlink reference signal comprises a set of channel state information reference signal resources.

Aspect 4: The method of any of aspects 1 through 3, wherein the first quasi-colocation source comprises one or more synchronization signal blocks associated with a broadcast channel, the method further comprising: receiving the one or more synchronization signal blocks via the one or more configurable surfaces.

Aspect 5: The method of any of aspects 1 through 4, further comprising: identifying that the first quasi-colocation source is configured to be transmitted via the one or more configurable surfaces based at least in part on a format for a signal associated with the first quasi-colocation source.

Aspect 6: The method of any of aspects 1 through 5, wherein the one or more configurable surfaces comprise one or more reflective surfaces, one or more refractive surfaces, or both.

Aspect 7: The method of any of aspects 1 through 6, wherein the configuration indicates a set of transmission configuration states, the set of transmission configuration states comprising the first transmission configuration state and a second transmission configuration state indicating a second quasi-colocation source that is not associated with transmission via the one or more configurable surfaces, the method further comprising: receiving control information comprising an indication that activates the first transmission configuration state or the second transmission configuration state; and receiving the first downlink channel transmission according to the first transmission configuration state or receiving a second downlink channel transmission according to the second transmission configuration state, based at least in part on the indication.

Aspect 8: The method of aspect 7, wherein the second quasi-colocation source comprises a downlink reference signal, the method further comprising: receiving the downlink reference signal via a transmission path excluding the one or more configurable surfaces, based at least in part on the indication.

Aspect 9: The method of any of aspects 7 through 8, wherein the control information further indicates a set of resources associated with receiving the first downlink channel transmission or the second downlink channel transmission.

Aspect 10: The method of any of aspects 7 through 9, further comprising: transmitting an activation request indicating the first transmission configuration state or the second transmission configuration state, wherein the control information is received based at least in part on the activation request.

Aspect 11: A method for wireless communication at a base station, comprising: transmitting a configuration for a first transmission configuration state associated with receiving a first downlink channel transmission via one or more configurable surfaces, the first transmission configuration state indicating a first quasi-colocation source that is associated with transmission via the one or more configurable surfaces; and transmitting the first downlink channel transmission via the one or more configurable surfaces based at least in part on the first transmission configuration state and the first quasi-colocation source.

Aspect 12: The method of aspect 11, wherein the first quasi-colocation source comprises a downlink reference signal, the method further comprising: transmitting the downlink reference signal via the one or more configurable surfaces.

Aspect 13: The method of aspect 12, wherein the downlink reference signal comprises a set of channel state information reference signal resources.

Aspect 14: The method of any of aspects 11 through 13, wherein the first quasi-colocation source comprises one or more synchronization signal blocks associated with a broadcast channel, the method further comprising: transmitting the one or more synchronization signal blocks via the one or more configurable surfaces.

Aspect 15: The method of any of aspects 11 through 14, further comprising: transmitting a signal associated with the first quasi-colocation source having a format associated with transmission via the one or more configurable surfaces.

Aspect 16: The method of any of aspects 11 through 15, wherein the one or more configurable surfaces comprise one or more reflective surfaces, one or more refractive surfaces, or both.

Aspect 17: The method of any of aspects 11 through 16, wherein the configuration indicates a set of transmission configuration states, the set of transmission configuration states comprising the first transmission configuration state and a second transmission configuration state indicating a second quasi-colocation source that is not associated with transmission via the one or more configurable surfaces, the method further comprising: transmitting control information comprising an indication that activates the first transmission configuration state or the second transmission configuration state; and transmitting the first downlink channel transmission according to the first transmission configuration state or transmitting a second downlink channel transmission according to the second transmission configuration state, based at least in part on the indication.

Aspect 18: The method of aspect 17, wherein the second quasi-colocation source comprises a downlink reference signal, the method further comprising: transmitting the downlink reference signal via a transmission path excluding the one or more configurable surfaces.

Aspect 19: The method of any of aspects 17 through 18, wherein the control information further indicates a set of resources associated with receiving the first downlink channel transmission or the second downlink channel transmission.

Aspect 20: The method of any of aspects 17 through 19, further comprising: receiving an activation request indicating the first transmission configuration state or the second transmission configuration state, wherein the control information is transmitted based at least in part on the activation request.

Aspect 21: A method for wireless communication at a UE, comprising: receiving a configuration for a first transmission configuration state associated with receiving a downlink channel transmission from a base station via one or more configurable surfaces, the first transmission configuration state indicating a first quasi-colocation source associated with the downlink channel transmission; determining that the first quasi-colocation source is not associated with transmission via the one or more configurable surfaces; and communicating with the base station via the one or more configurable surfaces based at least in part on the determining that the first quasi-colocation source is not associated with transmission via the one or more configurable surfaces.

Aspect 22: The method of aspect 21, further comprising: transmitting an indication that the configuration for the first transmission configuration state conflicts with the first quasi-colocation source, the receiving of the downlink channel transmission, or both.

Aspect 23: The method of aspect 22, wherein transmitting the indication comprises transmitting a beam failure indication associated with the first quasi-colocation source.

Aspect 24: The method of any of aspects 22 through 23, wherein transmitting the indication comprises transmitting a measurement report associated with the first quasi-colocation source.

Aspect 25: The method of any of aspects 21 through 24, further comprising: receiving the downlink channel transmission via the one or more configurable surfaces based at least in part on a second transmission configuration state associated with receiving the downlink channel transmission via the one or more configurable surfaces, the second transmission configuration state indicating a second quasi-colocation source associated with the downlink channel transmission.

Aspect 26: The method of aspect 25, wherein the second transmission configuration state comprises a previous transmission configuration state.

Aspect 27: The method of any of aspects 25 through 26, wherein the second quasi-colocation source is associated with transmission via the one or more configurable surfaces.

Aspect 28: An apparatus for wireless communication at a UE, comprising a processor; memory coupled with the processor; and instructions stored in the memory and executable by the processor to cause the apparatus to perform a method of any of aspects 1 through 10.

Aspect 29: An apparatus for wireless communication at a UE, comprising at least one means for performing a method of any of aspects 1 through 10.

Aspect 30: A non-transitory computer-readable medium storing code for wireless communication at a UE, the code comprising instructions executable by a processor to perform a method of any of aspects 1 through 10.

Aspect 31: An apparatus for wireless communication at a base station, comprising a processor; memory coupled with the processor; and instructions stored in the memory and executable by the processor to cause the apparatus to perform a method of any of aspects 11 through 20.

Aspect 32: An apparatus for wireless communication at a base station, comprising at least one means for performing a method of any of aspects 11 through 20.

Aspect 33: A non-transitory computer-readable medium storing code for wireless communication at a base station, the code comprising instructions executable by a processor to perform a method of any of aspects 11 through 20.

Aspect 34: An apparatus for wireless communication at a UE, comprising a processor; memory coupled with the processor; and instructions stored in the memory and executable by the processor to cause the apparatus to perform a method of any of aspects 21 through 27.

Aspect 35: An apparatus for wireless communication at a UE, comprising at least one means for performing a method of any of aspects 21 through 27.

Aspect 36: A non-transitory computer-readable medium storing code for wireless communication at a UE, the code comprising instructions executable by a processor to perform a method of any of aspects 21 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving a configuration for a first transmission configuration state associated with receiving a first downlink channel transmission via one or more configurable surfaces, the first transmission configuration state indicating a first quasi-co-location source that is associated with transmission via the one or more configurable surfaces; and
   receiving the first downlink channel transmission via the one or more configurable surfaces based at least in part on the first transmission configuration state and the first quasi-co-location source.

2. The method of claim 1, wherein the first quasi-co-location source comprises a downlink reference signal, the method further comprising:
   receiving the downlink reference signal via the one or more configurable surfaces.

3. The method of claim 2, wherein the downlink reference signal comprises a set of channel state information reference signal resources.

4. The method of claim 1, wherein the first quasi-co-location source comprises one or more synchronization signal blocks associated with a broadcast channel, the method further comprising:
   receiving the one or more synchronization signal blocks via the one or more configurable surfaces.

5. The method of claim 1, further comprising:
   identifying that the first quasi-co-location source is configured to be transmitted via the one or more configurable surfaces based at least in part on a format for a signal associated with the first quasi-co-location source.

6. The method of claim 1, wherein the one or more configurable surfaces comprise one or more reflective surfaces, one or more refractive surfaces, or both.

7. The method of claim 1, wherein the configuration indicates a set of transmission configuration states, the set of transmission configuration states comprising the first transmission configuration state and a second transmission configuration state indicating a second quasi-co-location source that is not associated with transmission via the one or more configurable surfaces, the method further comprising:
   receiving control information comprising an indication that activates the first transmission configuration state or the second transmission configuration state; and
   receiving the first downlink channel transmission according to the first transmission configuration state or receiving a second downlink channel transmission according to the second transmission configuration state, based at least in part on the indication.

8. The method of claim 7, wherein the second quasi-co-location source comprises a downlink reference signal, the method further comprising:
   receiving the downlink reference signal via a transmission path excluding the one or more configurable surfaces, based at least in part on the indication.

9. The method of claim 7, wherein the control information further indicates a set of resources associated with receiving the first downlink channel transmission or the second downlink channel transmission.

10. The method of claim 7, further comprising:
    transmitting an activation request indicating the first transmission configuration state or the second transmission configuration state, wherein the control information is received based at least in part on the activation request.

11. A method for wireless communication at a base station, comprising:
    transmitting a configuration for a first transmission configuration state associated with receiving a first downlink channel transmission via one or more configurable surfaces, the first transmission configuration state indicating a first quasi-co-location source that is associated with transmission via the one or more configurable surfaces; and
    transmitting the first downlink channel transmission via the one or more configurable surfaces based at least in part on the first transmission configuration state and the first quasi-co-location source.

12. The method of claim 11, wherein the first quasi-co-location source comprises a downlink reference signal, the method further comprising:
    transmitting the downlink reference signal via the one or more configurable surfaces.

13. The method of claim 12, wherein the downlink reference signal comprises a set of channel state information reference signal resources.

14. The method of claim 11, wherein the first quasi-co-location source comprises one or more synchronization signal blocks associated with a broadcast channel, the method further comprising:
    transmitting the one or more synchronization signal blocks via the one or more configurable surfaces.

15. The method of claim 11, further comprising:
    transmitting a signal associated with the first quasi-co-location source having a format associated with transmission via the one or more configurable surfaces.

16. The method of claim 11, wherein the one or more configurable surfaces comprise one or more reflective surfaces, one or more refractive surfaces, or both.

17. The method of claim 11, wherein the configuration indicates a set of transmission configuration states, the set of transmission configuration states comprising the first transmission configuration state and a second transmission configuration state indicating a second quasi-co-location source that is not associated with transmission via the one or more configurable surfaces, the method further comprising:
- transmitting control information comprising an indication that activates the first transmission configuration state or the second transmission configuration state; and
- transmitting the first downlink channel transmission according to the first transmission configuration state or transmitting a second downlink channel transmission according to the second transmission configuration state, based at least in part on the indication.

18. The method of claim 17, wherein the second quasi-co-location source comprises a downlink reference signal, the method further comprising:
- transmitting the downlink reference signal via a transmission path excluding the one or more configurable surfaces.

19. The method of claim 17, wherein the control information further indicates a set of resources associated with receiving the first downlink channel transmission or the second downlink channel transmission.

20. The method of claim 17, further comprising:
- receiving an activation request indicating the first transmission configuration state or the second transmission configuration state, wherein the control information is transmitted based at least in part on the activation request.

21. A method for wireless communication at a user equipment (UE), comprising:
- receiving a configuration for a first transmission configuration state associated with receiving a downlink channel transmission from a base station via one or more configurable surfaces, the first transmission configuration state indicating a first quasi-co-location source associated with the downlink channel transmission;
- determining that the first quasi-co-location source is not associated with transmission via the one or more configurable surfaces; and
- communicating with the base station via the one or more configurable surfaces based at least in part on the determining that the first quasi-co-location source is not associated with transmission via the one or more configurable surfaces.

22. The method of claim 21, further comprising:
- transmitting an indication that the configuration for the first transmission configuration state conflicts with the first quasi-co-location source, the receiving of the downlink channel transmission, or both.

23. The method of claim 22, wherein transmitting the indication comprises transmitting a beam failure indication associated with the first quasi-co-location source.

24. The method of claim 22, wherein transmitting the indication comprises transmitting a measurement report associated with the first quasi-co-location source.

25. The method of claim 21, further comprising:
- receiving the downlink channel transmission via the one or more configurable surfaces based at least in part on a second transmission configuration state associated with receiving the downlink channel transmission via the one or more configurable surfaces, the second transmission configuration state indicating a second quasi-co-location source associated with the downlink channel transmission.

26. The method of claim 25, wherein the second transmission configuration state comprises a previous transmission configuration state.

27. The method of claim 25, wherein the second quasi-co-location source is associated with transmission via the one or more configurable surfaces.

28. An apparatus for wireless communication at a user equipment (UE), comprising:
- means for receiving a configuration for a first transmission configuration state associated with receiving a first downlink channel transmission via one or more configurable surfaces, the first transmission configuration state indicating a first quasi-co-location source that is associated with transmission via the one or more configurable surfaces; and
- means for receiving the first downlink channel transmission via the one or more configurable surfaces based at least in part on the first transmission configuration state and the first quasi-co-location source.

29. The apparatus of claim 28, wherein the first quasi-co-location source comprises a downlink reference signal, the apparatus further comprising:
- means for receiving the downlink reference signal via the one or more configurable surfaces.

30. The apparatus of claim 29, wherein the downlink reference signal comprises a set of channel state information reference signal resources.

* * * * *